(12) United States Patent
Pederson et al.

(10) Patent No.: US 7,801,671 B1
(45) Date of Patent: Sep. 21, 2010

(54) METHODS AND APPARATUS FOR DETECTING MISFIRES

(76) Inventors: Neal R. Pederson, 2173 Deer Trail, Los Alamos, NM (US) 87544; Bernie C. Thompson, 27 Candido, Tijeras, NM (US) 87059

(*) Notice: Subject to any disclaimer, the term of this patent is extended or adjusted under 35 U.S.C. 154(b) by 408 days.

(21) Appl. No.: 11/899,271

(22) Filed: Sep. 4, 2007

Related U.S. Application Data

(60) Provisional application No. 60/842,310, filed on Sep. 5, 2006.

(51) Int. Cl.
*G01M 15/00* (2006.01)
*G06F 19/00* (2006.01)

(52) U.S. Cl. .................... 701/111; 73/117.03

(58) Field of Classification Search .......... 701/111, 701/99, 102, 101, 110; 73/117.03, 117.02, 73/116, 118.01; 123/406.27, 406.14, 406.17
See application file for complete search history.

(56) References Cited

U.S. PATENT DOCUMENTS 6,526,954 B1 * 3/2003 Baranzahi et al. ........... 123/673
6,651,490 B1 * 11/2003 Ceccarani et al. .......... 73/114.74

* cited by examiner

*Primary Examiner*—Hieu T Vo
(74) *Attorney, Agent, or Firm*—DeWitt M. Morgan

(57) ABSTRACT

Identifying fires by: measuring pressure pulses from the exhaust; generating a waveform from the measured pressure pulses; dividing the waveform into segments, one for each engine cylinder; associating each segment with the cylinder which generated the pulse; and examining each segment for features which indicate a misfire. The method further includes: generating a trigger signal; associating the trigger signal with ignition in a cylinder; measuring the time between this signal and the next trigger signal; dividing the time between these trigger signals into cylinder boxes, one for each cylinder; and shifting each of the boxes relative to the associated segment such that the peak and a portion of the rising edge and/or the falling edge falls within the box. For each box the peak, rising edge and falling edge is compared with threshold values. Each box in which at least two of the thresholds are exceeded is flagged.

15 Claims, 21 Drawing Sheets
(20 of 21 Drawing Sheet(s) Filed in Color)

METHODS AND APPARATUS FOR DETECTING MISFIRES

CLAIM OF PRIORITY

This application is a continuation-in-part of and claims the priority of provisional application Ser. No. 60/842,310, filed Sep. 5, 2006.

FIELD OF THE INVENTION

This invention relates to automotive test equipment. More particularly, the present invention relates to apparatus and methods of detecting cylinder misfires, including both intermittent and multiple misfires and then identifying the probable cause(s) of such intermittent or multiple misfires.

BACKGROUND OF THE INVENTION

The 4 cycle internal combustion engine has four cycles or four strokes that occur in 720° of crankshaft rotation. Each cycle occurs within approximately 180° of crankshaft rotation. The first cycle is the induction cycle or intake stroke in which the intake valve opens as the piston moves over top dead center and starts to move downward or away from the cylinder head. The intake port is connected to the intake manifold which has one end that is exposed to atmospheric pressure. As the piston moves downward it creates a pressure differential or vacuum that allows the atmosphere to fill the cylinder with air. The cylinder fills with air until the intake valve closes. At this point the crankshaft is moving the piston in an upward direction or towards the cylinder head. Both valves, intake and exhaust, are closed as the piston moves upward. As the piston continues its upward movement it compresses and heats the air that has been trapped inside the cylinder. If fuel is added during the induction stroke the fuel will also be heated. As the piston reaches the top of its stroke the heat from the compression will be at its peak. In the spark ignition (SI) internal combustion engine a spark will be generated that will ionize across the spark plug electrodes. This spark will start a chemical reaction between the oxygen and hydrocarbon (gasoline), which will release heat energy that will expand, building pressure in the cylinder. As this pressure builds it will push the piston downward, away from the cylinder head. In the compression ignition (CI) engine fuel will be injected under high pressure into the heated compressed air that is within the cylinder. The heat generated during the compression stroke will start a chemical reaction between the oxygen and hydrocarbons (diesel), which will release heat energy that will build pressure in the cylinder. As this pressure builds it will push the piston downward away from the cylinder head. In either the SI or the CI engines, the chemical reaction propagates across the cylinder head building pressure that will accelerate the piston in a downward movement. Once the reaction between the oxygen and hydrocarbons is completed the exhaust valve will open releasing the remaining pressure into the exhaust manifold. The piston will now move in an upward direction toward the cylinder head forcing the burned gases out of the cylinder into the exhaust manifold. The piston will reach the top of its stroke and the intake valve will once again open and the cycle will start over again. The foregoing is illustrated in FIGS. 1-4 of provisional application Ser. No. 60/842,310, which are incorporated by reference.

Since the conception of the internal combustion engine, combustion efficiency has been a problem. Early on it was a source of power loss. As vehicles have moved into the modern era air quality has become of prime concern. Federal and state government mandates require automobile manufacturers to install equipment to monitor tailpipe emissions. On vehicles newer than 1996, the manufacturer must also install monitors to detect a misfire and turn on the vehicle's malfunction indicator lamp when the emissions levels from the tailpipe exceed 1.5% of the Federal Test Procedure (FTP). A drawback with the FTP requirement is that an intermittent misfire will not produce emission levels exceeding 1.5% of the FTP tailpipe emissions. Therefore a diagnostic trouble code will not be stored in the powertrain control module (the vehicle's onboard microprocessor which monitors and controls the running parameters of the engine) for such a misfiring cylinder or cylinders. Such misfire(s) will, however, cause a drivability problem with the vehicle. It is also known that some vehicles have powertrain control module programming errors that detect and report the incorrect cylinder for the misfire condition. "Misfire" as used herein refers to a range of combustion inefficiencies in a cylinder. Such inefficiencies range from a complete misfire (e.g., where the fuel-air mixture does not ignite at all) to conditions where the efficiency is less than achieved in a normally running engine. Examples of the latter include: lean air/fuel ratio; rich air/fuel ratio; ignition spark weak or out of time; or low compression within the cylinder.

What is needed is a method and apparatus, other than the vehicle's on-board diagnostics, to alert a technician which cylinder (or cylinders) is (are) misfiring. It would also be desirable to find misfiring conditions on older model vehicles and heavy duty vehicles that are compression ignition based. Beyond identifying the cylinder(s) that is (are) misfiring, what is also needed is methodology and apparatus to also identify the probable cause(s) of the misfire(s).

U.S. Pat. No. 7,031,828 to Thompson et al. discloses detecting combustion inefficiencies by monitoring the oxygen level in the vehicle's exhaust path. This patent states that, if the oxygen level peaks, it may be inferred that there was an incomplete explosion in one of the cylinders. The peak in the oxygen level is linked to a particular cylinder in one of two ways. In a first embodiment, a plurality of oxygen sensors is placed in an exhaust manifold. Preferably, each cylinder of the engine has an associated sensor. When a given cylinder vents exhaust that has a high oxygen level, the high oxygen level is detected by the associated sensor and the cylinder is identified as potentially having combustion inefficiency. The sensors may communicate with an onboard computer so that this condition may be monitored and an alarm generated. There is no known engine in current production in which each cylinder has an associated sensor. Further such a system, even if available, could not determine the probable cause or causes of the detected misfires.

The second disclosed embodiment in the Thompson et al. patent addresses testing engines that do not have the sensor system of the first embodiment. As such, this embodiment includes software that, according to Thompson et al., a service technician can use to identify which cylinder in the vehicle is misfiring. This embodiment connects an external probe to a lambda (also known as an $O_2$) sensor already present in the exhaust path of the vehicle. Concurrently, a timing reference is generated that references when the first cylinder of the engine is in the combustion stroke. If there is a peak in the level of oxygen in the exhaust path, a misfire or other combustion inefficiency may be inferred. However, to link the peak in the oxygen level to a particular cylinder, additional information is required in the form of a database of "fingerprints" or "signatures" for the various engine types in service. The length of time between the timing reference point and the peak in the oxygen level is established and compared to the fingerprint or signature for the engine type. From this comparison, it is claimed that the software can determine which cylinder is misfiring.

As is evident from col. 8, l. 38-col. 9, l. 5 and FIG. 8 of the Thompson et al. patent, the method of acquiring a set of fingerprints from a single engine is labor intensive. Given that there are hundreds of automobile engines currently in service in the United States, the impractically of acquiring fingerprints is evident. And, like the first embodiment, there is no way to determine the cause or causes of the detected misfires.

In article entitled Drivability Corner, Motor, June 2006, M. Warren, the use of an exhaust probe and an automotive oscilloscope to locate misfires is disclosed. The exhaust probe is identified as a "First-Look exhaust probe." The article concludes by stating: "Using an exhaust probe with a scope takes practice, common sense, experience and logical follow-up testing." The First-Look exhaust "probe" is sensor (specifically a Piezo differential sensor), not a probe (i.e., an electrical probe) as that term is used in the Thompson et al. patent.

Pico Technology is offering for sale the "ACE Missfire Detective" from Thompson Auto Labs. Pico's website (http://www.picotech.com/auto/engine-misfire-detection.html) indicates that the ACE system includes a computer, "ACE Misfire software," a Pico automotive oscilloscope, and an inductive pick-up. Optionally, if one wants to test through the exhaust, a "FirstLook Sensor," and a sync probe are required. The website states that: "ACE uses a Pico automotive oscilloscope to identify the high pressure pulse of the exhaust stroke of a misfiring cylinder driven by the unconsumed oxygen of a misfire." The website also states: "ACE displays a diagram of the engine being worked on and flashes cylinders in firing order sequence." Healthy cylinders flash green. Cylinders flash red when a misfire is detected. The ACE misfire software is not described. It apparently requires the user to "select the manufacture and type of engine." There is some sort of data base. "You can add your own vehicles to the data base and updates can also be downloaded from the internet." The ACE Misfire Detective is also available from Thompson Automotive Labs, LLC and from SenX Technology LLC. The website of SenX, the manufacture of the FirstLook sensor, includes the statement: "ACE software analyzes the exhaust pulse train to identify the lower than normal pulses coming from the exhaust stroke of a misfiring cylinder." (This appears to be inconsistent with the statement on the Pico website.) U.S. Pat. No. 7,031,828 is also listed. See http://www.senx-tech.com/snx_main_ace-misfire-management.html. Both websites indicate that the ACE Misfire Detective is limited to gasoline engines.

The FirstLook sensor is associated by the manufacture with U.S. Pat. No. 6,484,589 to Brock ("Brock I") and U.S. Patient No. 6,609,416 to Brock ("Brock II").

As is apparent from the foregoing, the ACE Missfire Detective has the following shortcomings: (1) it is limited to gas engines; (2) there is no live misfire counter (rather the misfires are located in blocks of misfire data); (3) data cannot be streamed continuously; (4) it has problems detecting multiple misfires; and (5) it cannot identify the cause(s) or probable cause(s) of the detected misfires.

OBJECTS OF THE INVENTION

It is an object of the present invention to provide a misfire detector which is easy to use, reasonably priced, is not limited to gasoline engines. The diesel engine is also susceptible to a misfiring cylinder or cylinders.

Additional objects include: providing apparatus and processes for identifying multiple misfires on a single engine including multiple misfires during a single fire cycle; generating and using continuously streaming data (so a misfire will not be missed due to a loss of acquiring the misfire data); and counting and displaying detected misfires (i.e., a misfire counter). A misfire counter is important to alert the technician to the extent of the problem (e.g., continuous misfire, frequent but intermittent misfire, infrequent misfire). "Fire cycle" refers to one complete firing cycle of an engine (e.g., cylinders 1-3-4-2 as illustrated in FIG. 5; cylinders 1-6-5-4-3-2 as illustrated in FIG. 10 for a 2000 GM 4.3 liter V-6 engine).

It is also an object of the present invention to identify the probable cause(s) of the detected misfires.

SUMMARY OF THE INVENTION

A method of identifying one or more misfires occurring in an internal combustion engine including the steps of: running the engine; measuring the pressure pulses from the exhaust of the engine; generating a waveform from the measured pressure pulses; dividing the waveform into segments, one for each cylinder of the engine, wherein each segment represents a pressure pulse; associating each waveform segment with the cylinder which generated the pressure pulse; and examining each waveform segment for features which indicate a misfire. The method further includes the step of generating a trigger signal and associating the trigger signal with the ignition in one of the cylinders of the engine. The method also includes steps of: measuring the time between the trigger signal and the next successive trigger signal; and dividing the time between the two trigger signals into a number of cylinder boxes, one for each cylinder of the engine. Each one of the waveform segments is associated with each one of the cylinder boxes; one waveform segment for each cylinder box. Also included is the step of shifting each of the cylinder boxes relative to the associated waveform segment such that the peak of the segment and at least a portion of one of the rising edge of the waveform segment and the falling edge of the waveform segment fall within the cylinder box. Preferably, the peak of each waveform segment is located in the center portion of its associated cylinder box. Threshold values for the peak value and at least one of the rising edge and falling edge of each waveform segment are also determined, first determining the medians for each of the peak values, rising edges and falling edges and then selecting the median from each group. Once determined, the peak in each cylinder box is compared with the threshold value for the peaks. Further, for each cylinder box, the rising edge of the waveform segment is compared with the threshold value for the rising edges and the falling edge of the waveform segment is compared with the threshold value for the falling edges. For each cylinder box, each threshold that is exceeded is flagged. Each cylinder box in which at least two of the thresholds are exceeded is identified as a misfire. The method further includes the step of synchronizing each of the cylinder boxes and its associated waveform segment with the cylinder in which the pulse was generated.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Figure 1:
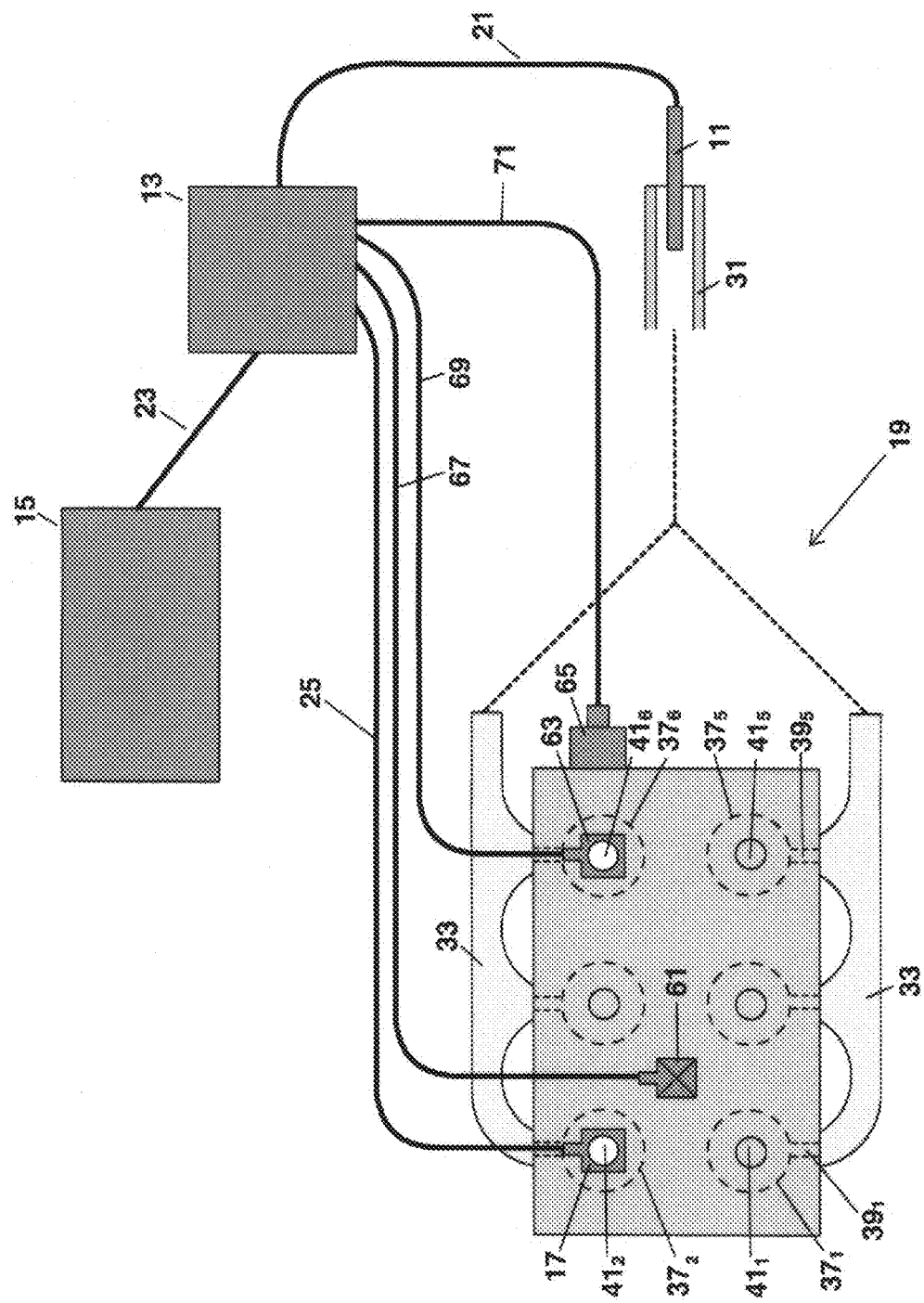
FIG. 1 is a schematic of the misfire detection system of the present invention.

With reference to FIG. 1, the misfire detector system of the present invention includes exhaust pressure sensing device 11, A/D converter 13, computer 15 and apparatus 17 for capturing a trigger signal from engine 19. Exhaust pressure sensor 11 is connected to a conventional A/D converter 13 by cable 21 which, in turn, is connected to computer 15 by cable 23. Trigger apparatus 17 is connected to A/D converter 13 by cable 25.

Exhaust pressure sensor 11 may be a FirstLook sensor manufactured by SenX Technology, LLC ("SenX") or a MLH Series pressure sensor from Honeywell, or an All Sensor's H2O Hall Effect sensor, or equivalent. These devices will be referred to as a "basic pressure transducer". As explained later, improved performance is obtained with the use of the venturi amplified sensor disclosed and claimed in co-pending U.S. patent application Ser. No. 11/879,565, the disclosure of which is incorporated by reference. With the venturi sensor multiple misfires, including multiple misfires in the same fire cycle, can easily be detected. Further, with the use of the venturi sensor (together with an intake pressure sensing device, and/or compression sensing device, and/or crank case pressure sensing device), probable causes of engine misfires can also be identified.

Computer 15 may be a conventional laptop having the following minimum performance requirements: Windows XP, 30G hard drive, 256 Ram, and XGA graphics.

Trigger apparatus 17 is any suitable conventional device for sensing the electrical field of a spark plug when it fires and relaying an electrical signal. The electrical signal is picked up by an inductive clamp or capacitive clamp that is placed around the spark plug wire. The trigger can also use the primary ignition waveform from the ignition coil control. Alternately, for compression ignition engines, the trigger signal can be acquired from the voltage control signal that operates the fuel injector or trigger apparatus 17 is an electromechanical device which senses when a fuel injector injects fuel into a cylinder and then transmits an electrical signal. For example, a Piezo sensing device may be mounted to a high pressure fuel injection line that is isolated to one cylinder. In either case, an analog voltage signal is generated and relayed to A/D converter 13 where it is converted to binary code that is then transmitted to computer 15. As is explained below, such trigger signal is used to synchronize the exhaust pressure pulses (or exhaust pulses) sensed by pressure sensor 11 with the cylinder in which the pulses originate. The trigger signal originates from the ignition (or injection) in the particular cylinder to which trigger apparatus 17 is connected (e.g., cylinder $37_2$ in FIG. 1, infra). The pressure transducer can be in the form of a basic pressure transducer or the venturi design disclosed in co-pending application Ser. No. 11/879,565.

Figure 2:
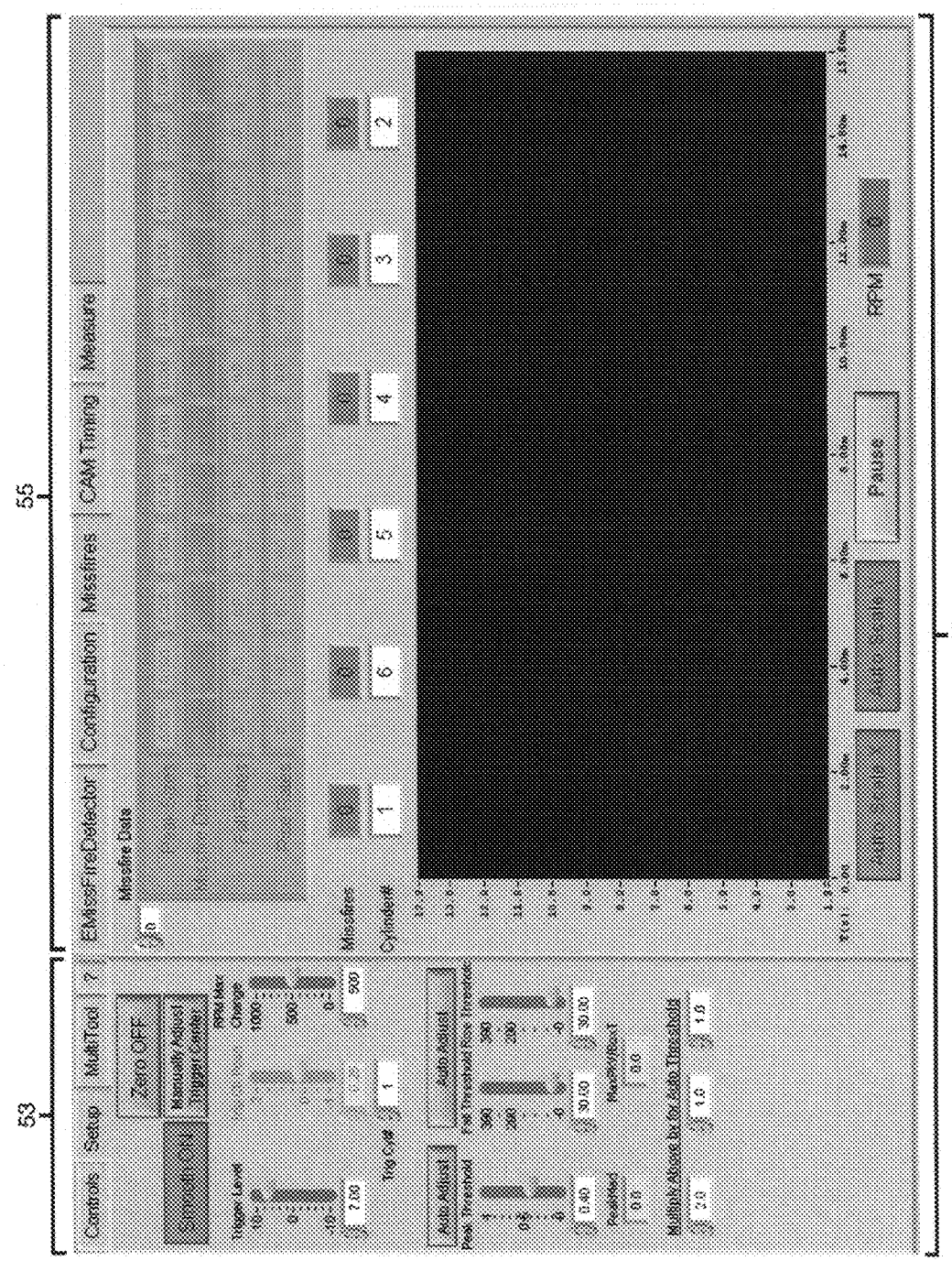
FIG. 2 is a screen display of the present invention illustrating the Setup and Missfires tabs open before a misfire test has started.
Figure 3:
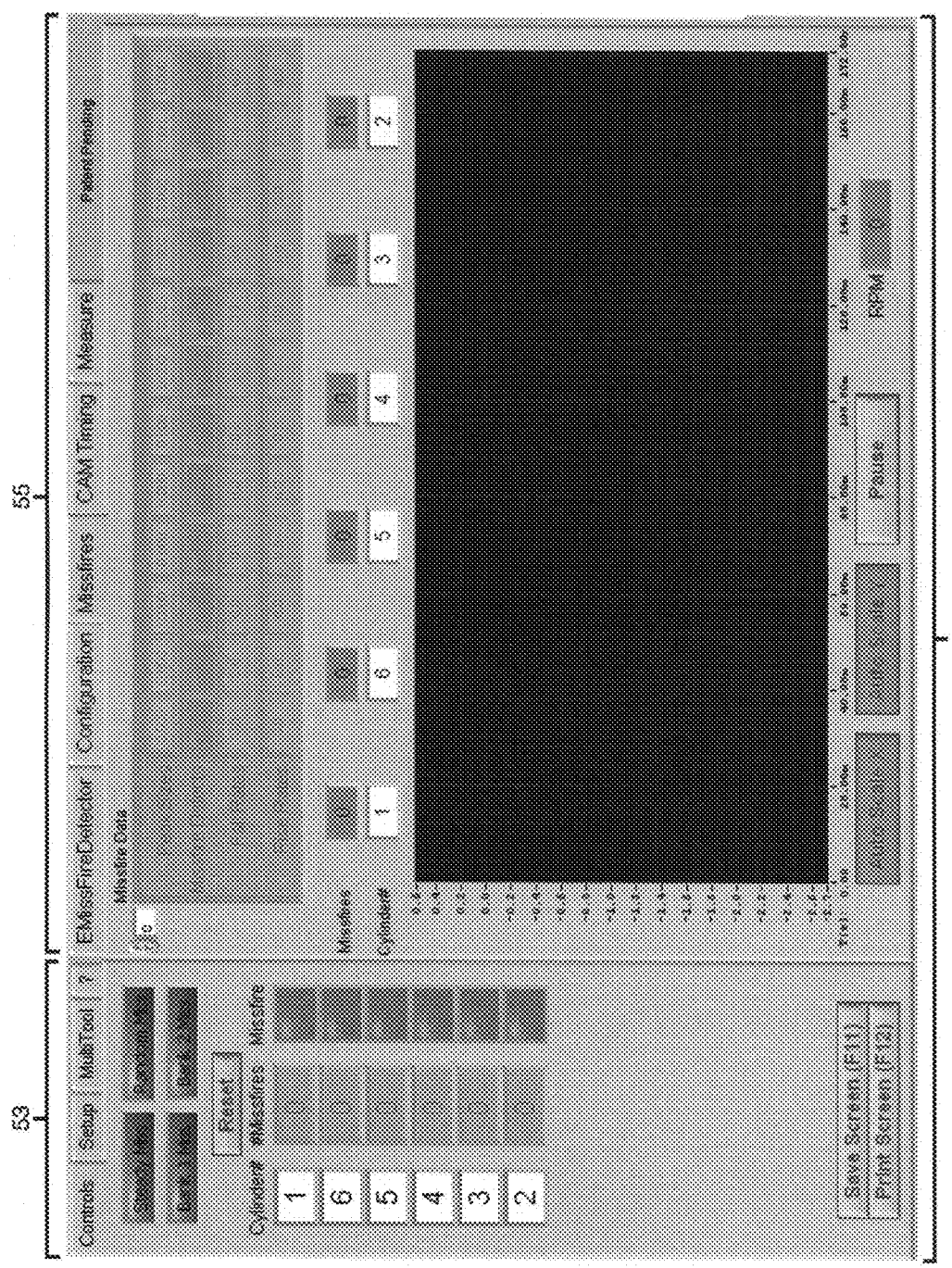
FIG. 3 is a screen display of the present invention illustrating the Controls and Missfires tabs open before a misfire test has started.

The present invention also includes providing, on the screen of computer 15, a number of screen displays (or windows), generally identified as 51. With reference to FIGS. 2 and 3 screen display 51 is divided into two sections, 53 and 55, with section 53 having four screen choices identified by tabs "Controls," "Setup," "MultiTool," and "?". Section 55 has five screen choices identified by tabs "EMissFire Detector," "Configuration," "Missfires," "CAM Timing," and "Measure". (On these tabs misfire is deliberately misspelled (e.g., "Missfire").) As illustrated in FIG. 2, the Setup and Missfires screens (or windows) are opened. In the Setup window the user inputs: the "Trigger Level", which sets the level at which the screen sweep will be activated; trigger center position ("Trig Ctr Posn"), which establishes the position of the cylinder box (as explained below) on the graph in relation to the trigger event and can only be manually adjusted if the "Manually Adjust Trigger Center" button located above is "on" (in which case it will turn from grey to green); "RPM Max Change", which functions as a control to limit the maximum change of RPM allowed before an RPM error is indicated by turning the normally green background of the "RPM" counter, as indicated on window 55 with the Missfires tab open, to red; "Trig Cyl#", which identifies the cylinder to which trigger apparatus 17 is connected; "Peak Threshold" (if "Auto Adjust" is turned off; it is green when activated), which sets the misfire detection threshold; "Fall Threshold" (again if the Auto Adjust is turned off), which sets the rate of the pressure change on the falling edge of the pressure waveform to indicate a misfire; "Rise Threshold" (again if the associated Auto Adjust is turned off), which sets the rate of the pressure change on the rising edge of the pressure waveform to indicate a misfire; and multipliers that are used for the course adjustment of Peak Threshold, Fall Threshold and Rise Threshold (under the heading "Multiply Above by for Auto Threshold") for the manual settings of the three threshold values. In the automatic mode, where the Auto Adjust buttons are "on" (and green), the foregoing thresholds and multipliers are set automatically. See FIGS. 15 and 16. The "Zero" button will change the message located on the button depending on whether the function is on or off. As illustrated in FIG. 2, the button is in the "OFF" position as indicated by the presence of the word OFF and the fact that the button is grey. If the Zero button is selected "on" it will turn green and the words "Zero ON" (not shown) will be visible. When "on" it will take the present pressure reading from sensor 11 and subtract it from all future readings to zero sensor 11. It is also used to zero the pressure transducers. The "Smooth" button will change the message located on the button depending on if the function is on or off. If "on" the button will turn green (as illustrated), the words "Smooth ON" will be visible, and a box car style filter that will smooth the pressure waveforms will be enabled.

In FIG. 3 display 51 is still divided into sections 53 and 55. However, in this case the screen for the Controls tab is visible, illustrating the alert lights "Steady Miss," "Random Miss," "Bank 1 Miss" and "Bank 2 Miss". Also illustrated are columns: "Cylinder#", "# Missfires", and "Missfire" alert lights. (Again, on the screens misfire is deliberately misspelled.) In the case of a 6 cylinder engine, as illustrated in FIGS. 2 and 3, only 6 windows are illustrated. Depending on the number of cylinders in the engine being tested, this number will vary from 3 to 4 to 5 to 6 to 8 to 10 and 12. See, for instance, FIGS. 6 and 21. In FIG. 3, section 53 also includes the "Reset", "Save Screen (F11)," and the "Print Screen (F12)" controls.

As is illustrated in FIGS. 2 and 3, screen section 55 includes a series of windows (up to 12; one for each cylinder of the engine being tested) for "Peak Sizes", "Missfire Detects", "Fall Rates" and "Rise Rates". Also included in screen section 55 are horizontal rows for "Missfires" and "Cylinder#". These two rows provide the same information as the Cylinder# and #Missfires columns in screen section 53. Further, the Missfire lights on screen section 53 and the Missfire Detects lights on screen section 55 are both illuminated only when the associated cylinder is misfiring during the fire cycle that is concurrently being displayed on the chart (or graph) portion of screen 55. If a particular cylinder only has an intermittent miss, the light pairs associated with such cylinder will not be continuously illuminated. The two horizontal rows for Missfires and Cylinder# also expand or contract from the 6 cylinders indicated, depending on the number of cylinders in the engine being tested. See, for instance, FIG. 6. Below the screen are: "Auto Scale X", which allows the X axis to be auto scaled; "Auto Scale Y"; which allows the Y axis to be auto scaled; "Pause", which allows the data on the graph to be paused; and an "RPM" counter which shows the current RPM the engine being tested is running at. The green color for Auto Scale X and Auto Scale Y indicate that both features are activated. In both figures the screen is still blank as no engine is running and no data is being displayed. For the same reason the Peak Sizes, Missfire Detects, Fall Rates and Rise Rates rows are "grayed out", as is the Pause button, and the RPM counter is at "0" in FIGS. 2 and 3.

The Multi Tool screen (not illustrated), is used when interfacing the present invention with other equipment (also not illustrated), such as an emission analyzer and/or ignition analyzer. The ? tab allows the user to access a help screen (not illustrated).

In operation pressure sensor 11 is inserted in the tailpipe 31 of a vehicle which also includes engine 19 having, inter alia, exhaust manifold 33, engine block 35, cylinders $37_{1-6}$, exhaust ports $39_{1-6}$ and spark plugs $41_{1-6}$. Alternately, for CI type engines, there would be fuel injectors (not shown) instead of spark plugs. Finally, illustratively, for purpose of acquiring a triggering signal, apparatus 17 is connected to spark plug $41_2$. Trigger apparatus 17 does not have to be connected to the spark plug (or, in the case of a diesel, to a fuel injector) of the number 1 cylinder of engine 19, just any conveniently accessible one. However, in the manual mode connecting trigger apparatus 17 to the cylinder (as identified by the engine manufacturer) which fires 360° of crankshaft rotation after the engine's number 1 cylinder fires is recommended to insure synchronization. In the manual mode attaching trigger apparatus 17 to another cylinder will work, but synchronization errors are more likely. In contrast, in the automated mode trigger apparatus 17 can be associated with any cylinder as the methodology of the present invention will automatically configure the correct placement of the exhaust pressure pulse (or exhaust pulse) based on the engine configuration (i.e., the number of cylinders and firing order) and cylinder to which trigger apparatus 17 is connected (via, for instance, the spark plug wire). In the automated mode the Trig Cyl# (as illustrated in, for instance, the Setup window illustrated in FIG. 2) allows the technician to choose a different cylinder than cylinder # 1 to attach trigger apparatus 17. This will adjust the Trig Ctr Posn as follows: Trig Ctr Posn=Trig Ctr Posn+number of cylinders the chosen cylinder is away from cylinder # 1. For example, in an engine with a firing order of 1-2-3-4-5-6, if Trig Ctr Posn=0.25 and the Trig Cyl# is set to 3 then Trig Ctr Posn=0.25+2=2.25.

The misfire detection system of the present invention, whether operating in the manual or automatic mode, works off of the pressure that is created during the reaction of the fuel burning in each of cylinders 37. If the fuel burns correctly in a cylinder there will be additional pressure in such cylinder from this chemical reaction. Just prior to the exhaust valve (not shown) closing, a high pressure wave will move out of the cylinder to the lower pressure in the vehicle's exhaust system with force. This high pressure wave is read by the pressure sensor 11. Conversely, lack of combustion in a cylinder 37 creates a low pressure wave on the exhaust stroke that is also read by pressure sensor 11. These pulses (whether high or low) are transmitted to A/D converter 13 in the form of analog voltage signals where they are converted to digital binary code that is then input to computer 15. (As explained below, in both the manual and automatic modes these exhaust pulses are put in time (i.e., synchronized) with the associated cylinders.)

When ignition discharge occurs both valves, intake and exhaust, of the associated cylinder are in the closed position. The piston then travels down on the power stroke to the bottom dead center point (BDC) (a rotation of 180° of the crankshaft of engine 19). The exhaust valve opens and the piston starts its exhaust stroke and travels back to top dead center (TDC), another 180° rotation of the crankshaft. Thus, from the point the ignition occurred in the cylinder to the end of the exhaust stroke is, approximately, equal to 360°. Approximately is used here because the opening of the exhaust valve does not occur at exactly BDC and exhaust valve closing does not occur at exactly TDC. Thus, in its most basic form, synchronization of the exhaust pulse with the cylinder ignition that initiated the pulse requires that trigger apparatus 17 be connected to the cylinder that, in terms of crankshaft rotation, has ignition 360° later. An example would be a 4 cylinder engine with a firing order or 1-3-4-2. Putting cylinder 1 and cylinder 3 together equals 360° from the number 1 ignition discharge to the number 3 ignition discharge. Thus, in this case the trigger would be placed on the number 3 ignition wire. This in turn would set the exhaust pulse event for the number 1 cylinder with the trigger signal from the number 3 cylinder.

Figure 4:
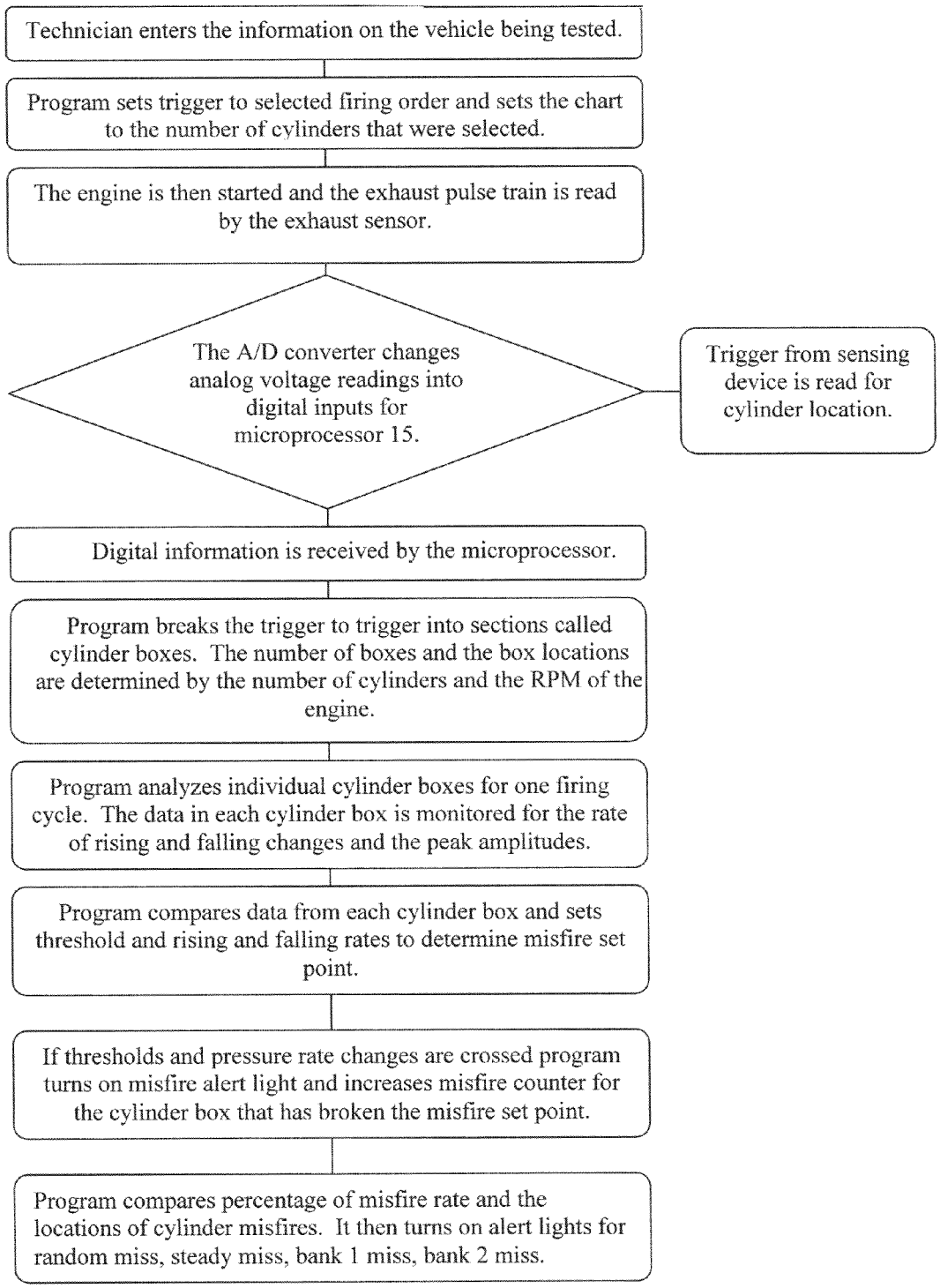
FIG. 4 is a flow chart illustrating the overall operational sequence of the present invention.

The basic operational steps of the misfire detection system of the present invention are illustrated in FIG. 4. Once pressure sensor 11 is inserted in tailpipe 31 and trigger apparatus 17 connected to a particular cylinder, the user (e.g., automotive technician) enters the required information on the engine being tested (number of cylinders and firing order), as more fully explained below in reference to FIG. 5. This sets the screen display (window 55 with the Configuration tab open) to the number of cylinders and firing order that was selected. Engine 19 is then started and the exhaust pulses (or exhaust pulse train) are read by pressure sensor 11. The trigger signal from apparatus 17 is also read for cylinder location. Both signals are sent to A/D converter 13 where the analog voltage readings are converted to digital inputs and transmitted to computer 15. Once the trigger signal is read for cylinder location, the time from one trigger signal to the next is divided by the number of cylinders to obtain chart (or graph) sections called "cylinder boxes". (These cylinder boxes are also sometimes referred to as "cells" or "divisions".) With the 4 cylinder engine identified in FIG. 5, there will be 4 cylinder boxes, as indicated by the graph in FIG. 6. While the number of cylinder boxes is determined by the number of cylinders in the engine being tested, the positioning of such boxes relative to the cylinder number (again, as identified by the engine manufacturer) is determined by the location of trigger apparatus 17 (i.e., the cylinder to which it is connected), the RPM of the engine and the number of cylinders (both as discussed below). Once the number of cylinder boxes is determined and each box is synchronized to the correct cylinder, the data in each cylinder box is monitored for the rate of rising and falling pressure changes and the peak amplitudes. The rising rate of pressure change for each cylinder box is indicated in the Rise Rate row of boxes if the associated cylinder is misfiring, such as illustrated for cylinder # 4 in FIG. 6. Similarly, the rate at which the pressure falls in a misfiring cylinder is indicated by the associated Fall Rate box, again such as illustrated in FIG. 6. Peak amplitude for each cylinder is indicated in the associated Peak Sizes box. After the waveform in each cylinder box is analyzed for the rate of rising and falling pressure changes and peak amplitudes, the data from all the cylinder boxes is compared and thresholds (or set points) are determined for the rising and falling rates. The data for each cylinder box is then compared to the thresholds. If, for any cylinder, at least two of the three thresholds are exceeded, the misfire alert lights for such cylinder are turned on. The misfire analysis for each cylinder is:

Find Valley (negative peak);

Find FWHM of Valley (half height, full width of valley);

Peak Size=Height of Valley (units are "$H_2O$);

Fall Rate=Rate in "H20/sec that valley falls from FWHM to bottom of valley; and

Rise Rate=Rate in "H20/sec that valley rises from bottom of valley to FWHM.

A misfire is detected if at least two of the following are true:

Peak Size>Peak Threshold

Fall Rate>Fall Rate Threshold

Rise Rate>Rise Rate Threshold

The misfire, as identified above, is also registered on the associated misfire counter on the Controls and Missfire screens. As continuously streaming data is being analyzed, misfires in each subsequent fire cycle (whether the same cylinder or another cylinder or both) are counted as they occur. The percentage of misfire rate and the location(s) of the cylinder misfires are then analyzed. Alert lights (as identified on the Controls screen) are then illuminated depending on number of cylinders missing and the type of miss (i.e., Random Miss, Steady Miss, Bank 1 Miss, Bank 2 Miss).

When using the ignition to set the timing there is a delay between the ignition of the fuel and the pressure wave or pulse emitted at the exhaust pipe where pressure sensor 11 is located. The spark occurs, igniting the air/fuel mixture. As discussed above, the piston is close to the top of its stroke and must move downward, close to the bottom of the stroke, before the exhaust valve opens to start releasing the cylinder pressure into the exhaust. This pressure wave travels through the exhaust piping, catalytic converter, and muffler before exiting to the atmosphere. As there is very little backpressure in the exhaust system the exhaust pressure wave has a small transport delay between the time the exhaust valve opens and the pressure wave exits to the atmosphere. For a 4 cylinder engine at idle the time between exhaust valve opening and exit from the tail pipe takes about 23 ms. (It is believed that this time delay varies due to such factors as the exhaust system configuration and condition.) As the RPM of the engine increases the exhaust pulse delay from the ignition signal decreases. The result is that the exhaust pulse drifts away from the associated trigger signal. At 2500 RPM this drift can be as much as the cycles for 2 cylinders, equivalent to 2 cylinder boxes. Thus, to accurately determine which cylinder is misfiring, the cylinder boxes will have to be delayed to synchronize the exhaust pulse created by the cylinder. This is accomplished by moving the cylinder box locations depending on the RPM the engine is running at and, also, the number of cylinders.

For the correct analysis of the waveform pulse in each cylinder box, each cylinder ignition must be synchronized to the associated pressure pulse as it exits the exhaust system. Because the present invention examines the rate of pressure rise, the rate of pressure fall and the peak size, correct analysis also requires that that the peak and at least one of the rising portion of the waveform and the falling portion fall within the cylinder box (or cell) associated with the ignition that generated the pulse. Associating the wrong cylinder with a particular waveform pulse will obviously result in misdiagnosis. Further, misalignment between a misfiring cylinder and its associated cell may also result in misdiagnosis. For this reason it is necessary to center the peak in its correct cell. Centering also accommodates for a range of exhaust pulse delays around the expected time delay. This is more fully explained below in conjunction with the venturi design disclosed in co-pending application Ser. No. 11/879,565.

Figure 5:
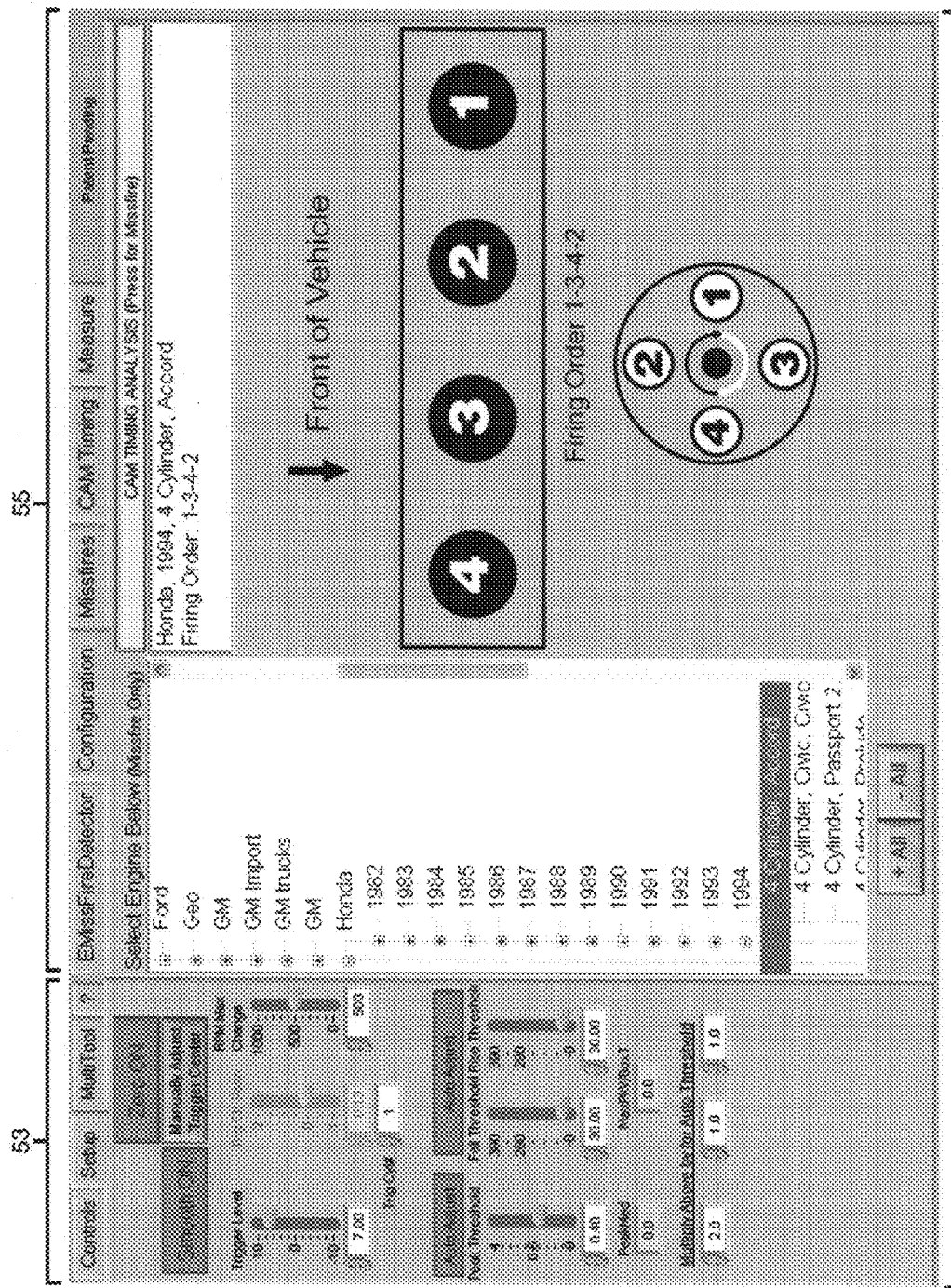
FIG. 5 is a screen display of the present invention illustrating the Configuration and Setup tabs opened.
Figure 6:
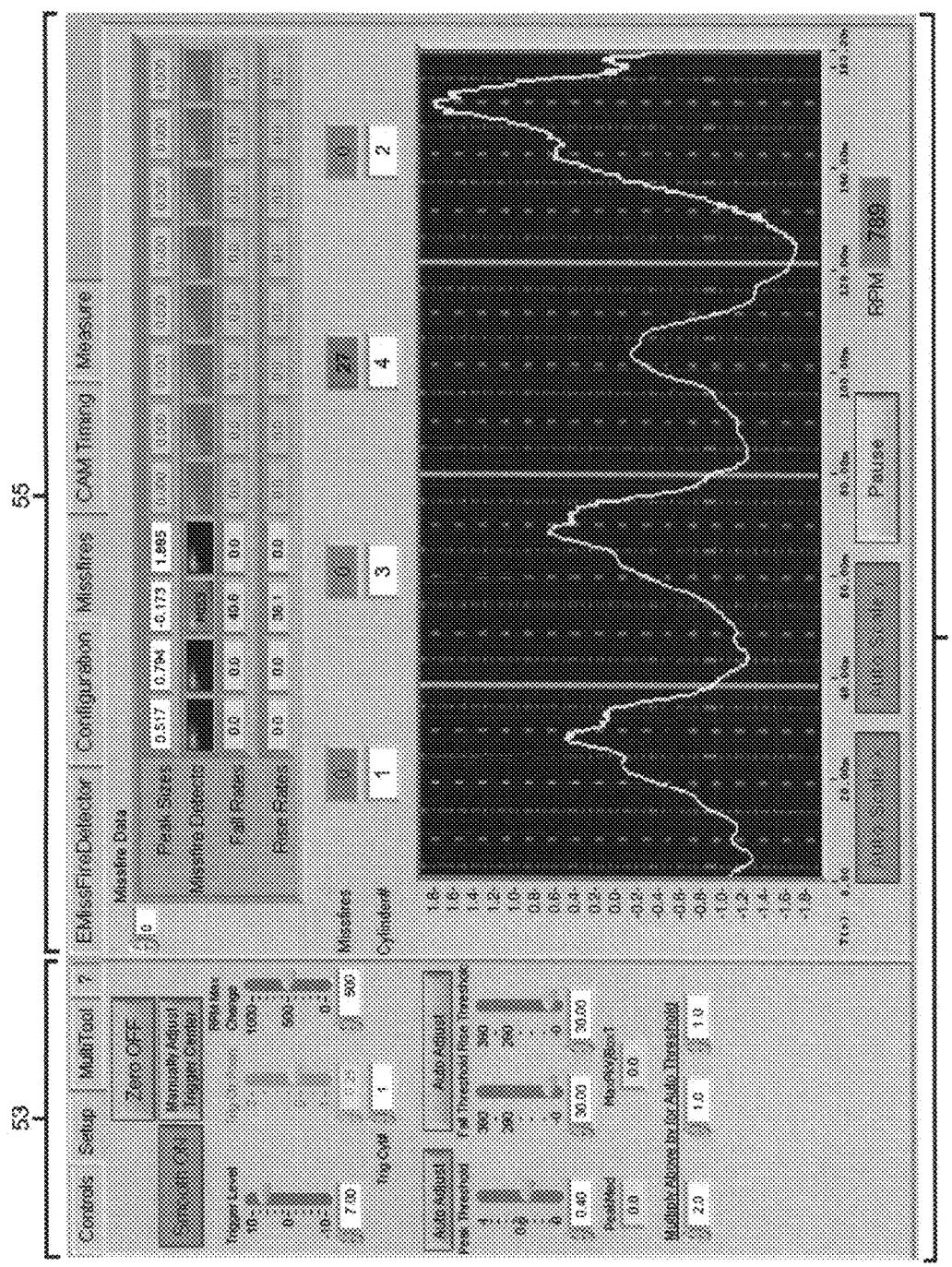
FIG. 6 is a screen display showing the Setup and Missfires tabs opened and with test data being collected with a basic pressure transducer (as hereinafter defined) on a running 4 cylinder engine with one misfire.

In FIG. 5 the Configuration tab of screen section 55 is open to illustrate the configuration of the engine being tested and the cylinder firing sequence. The firing order can be manually entered or, as illustrated, picked from a drop down list of specific vehicle engines and firing orders. If the user picks the engine from the list there is less chance of an error occurring while entering information. Once the engine is selected (in this case a Honda, 1994, 4 cylinder, Accord) the information is displayed together with the associated firing order. The orientation of the engine relative to the front of the vehicle and the number location of the cylinders is also displayed, as is the distributor. The "CAM TIMING ANALYSIS (Press for Missfire)" bar on the top allows the user to change between misfire analysis, cam timing (as explained below), compression analysis (as explained below), intake vacuum analysis (as explained below), and crank case pressure analysis (as also explained below). Once the analysis method is selected the correct pressure transducer scale is automatically loaded and zeroed for the correct pressure transducer. If the CAM TIMING ANALYSIS is selected for a gasoline engine a 300 psi transducer will automatically load. The 0.5 volt reading from this transducer will automatically be zeroed. Next the correct conversion factor to convert the voltage reading to a pressure reading is selected.

In FIG. 6, the data for the four-cylinder engine Honda engine identified in FIG. 5, with a single misfire associated with cylinder 4 is illustrated. A basic pressure transducer was used. The setup information is set to automatically adjust the settings for the engine being tested. As indicated above, in the automated mode, the technician can choose any convenient cylinder, so long as it correctly identified on the Setup screen, as illustrated in FIG. 5. (For some engines, the cylinder which the manufacturer identifies as 1 for the purposes of firing order is not readily accessible.) If the trigger signal from the chosen cylinder is erratic the RPM window will change from green to red and the data that is being processed will not be sampled while the signal is erratic. This insures that only accurate data is displayed on the misfire chart and graph and used to identify misfires. If the RPM display stays red the user will be instructed to move trigger apparatus to another cylinder.

With reference to the graph on the Missfires screen illustrated in FIG. 6, four cylinder boxes (one for the graph of each cylinder) are clearly illustrated. Above the graph, section 55 has a display to indicate which cylinder (or cylinders) are misfiring (in this case just the cylinder 4) and how frequently. Section 55 also displays the Peak Sizes for each individual cylinder and the Fall Rates and Rise Rates for the misfiring cylinder. By analyzing the Peak Sizes, Fall Rates and Rise Rates data in the manner set forth above, the random misfire in cylinder 4 is correctly identified.

Figure 7:
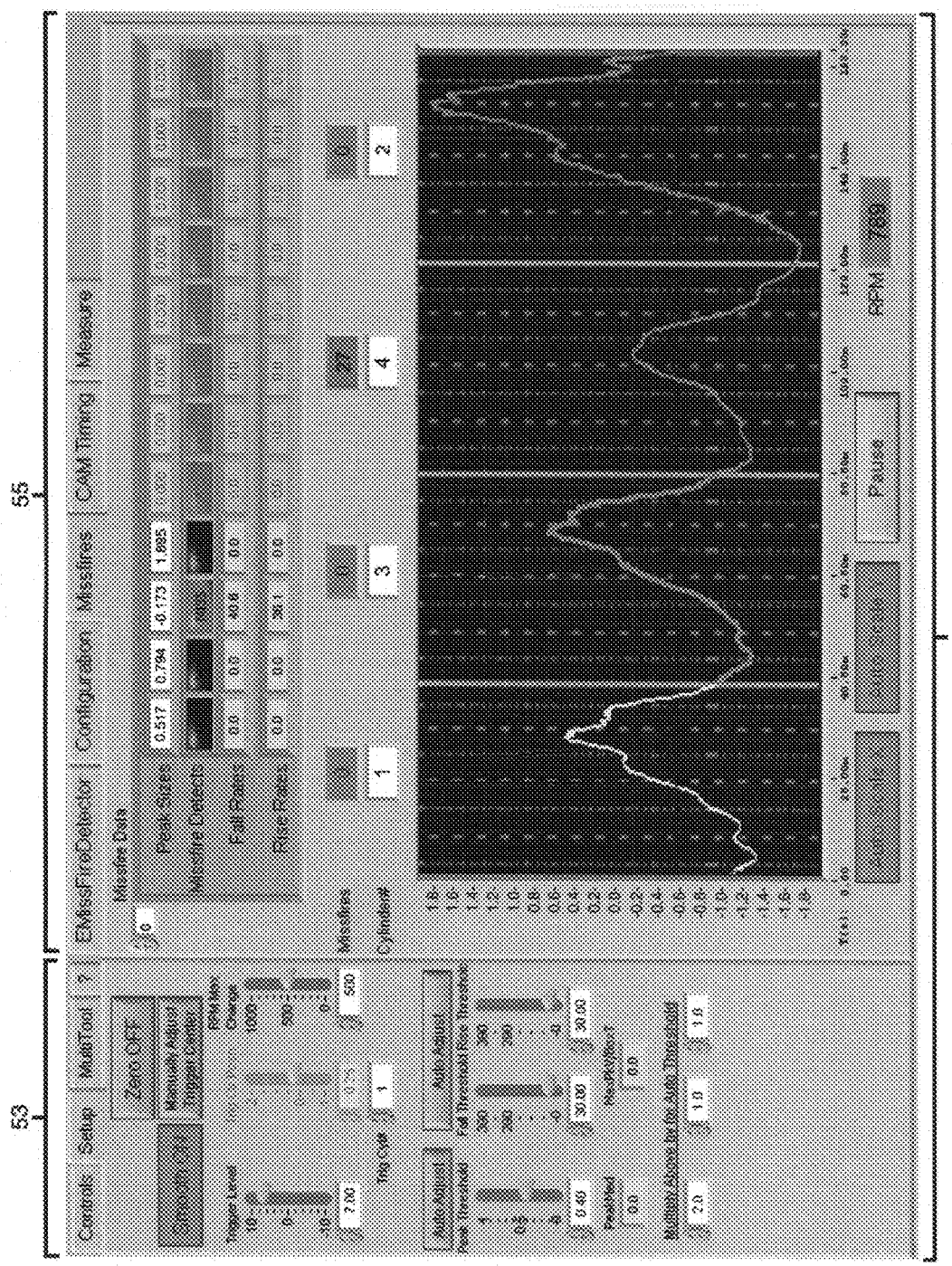
FIG. 7 is a screen display like that of FIG. 6, but with the graphs for each cylinder illustrated in a different color for purposes of explanation.

The information illustrated in FIG. 7 is the same as that illustrated in FIG. 6. The data illustrated in section 55 is identical, as are the graphs. However, for the purpose of further explaining this embodiment of the invention, the graph for each cylinder box is in a different color. These graphs are superimposed on each other in FIG. 8. To further demonstrate how this embodiment identifies a misfire FIG. 9 illustrates the high and low points of each graph (the blue dots indicate this information for the 4th, misfiring cylinder). As is evident from this figure, the high point of the graph for the number 4 cylinder is different time wise from the high points for the other cylinders. The percentage difference and the rate of change of the exhaust pressure in this cylinder is an indication of a misfire. Further, as is even more evident from this FIG. 9, the low point for the number 4 cylinder is way out of position (i.e., time) vis-à-vis the others. Here the percentage difference is clearly evident to the naked eye.

Figure 10:
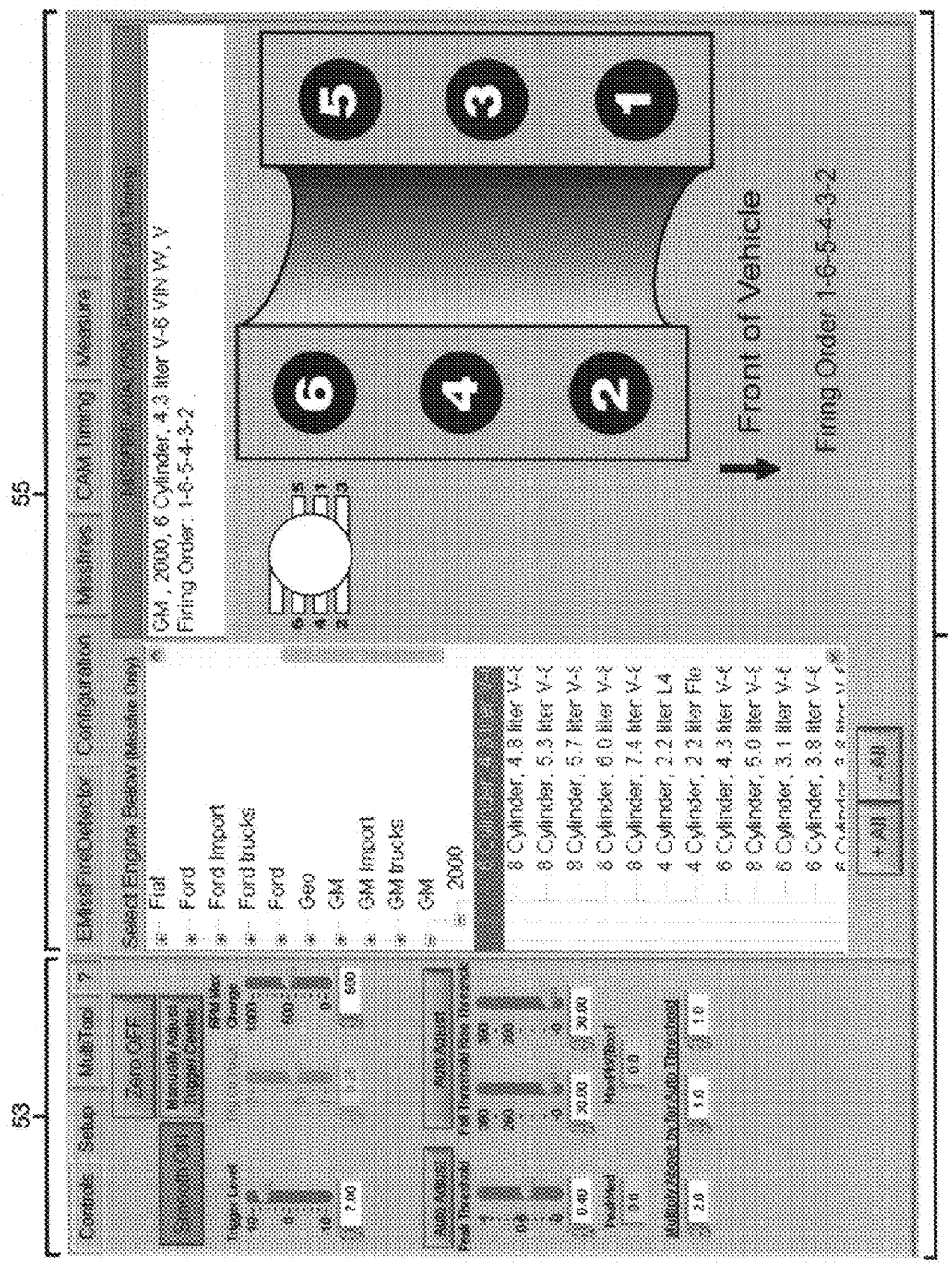
FIG. 10 is an example of the Setup and Configuration tabs open, with the Configuration screen showing the configuration and firing order of a GM v-6 engine.
Figure 11:
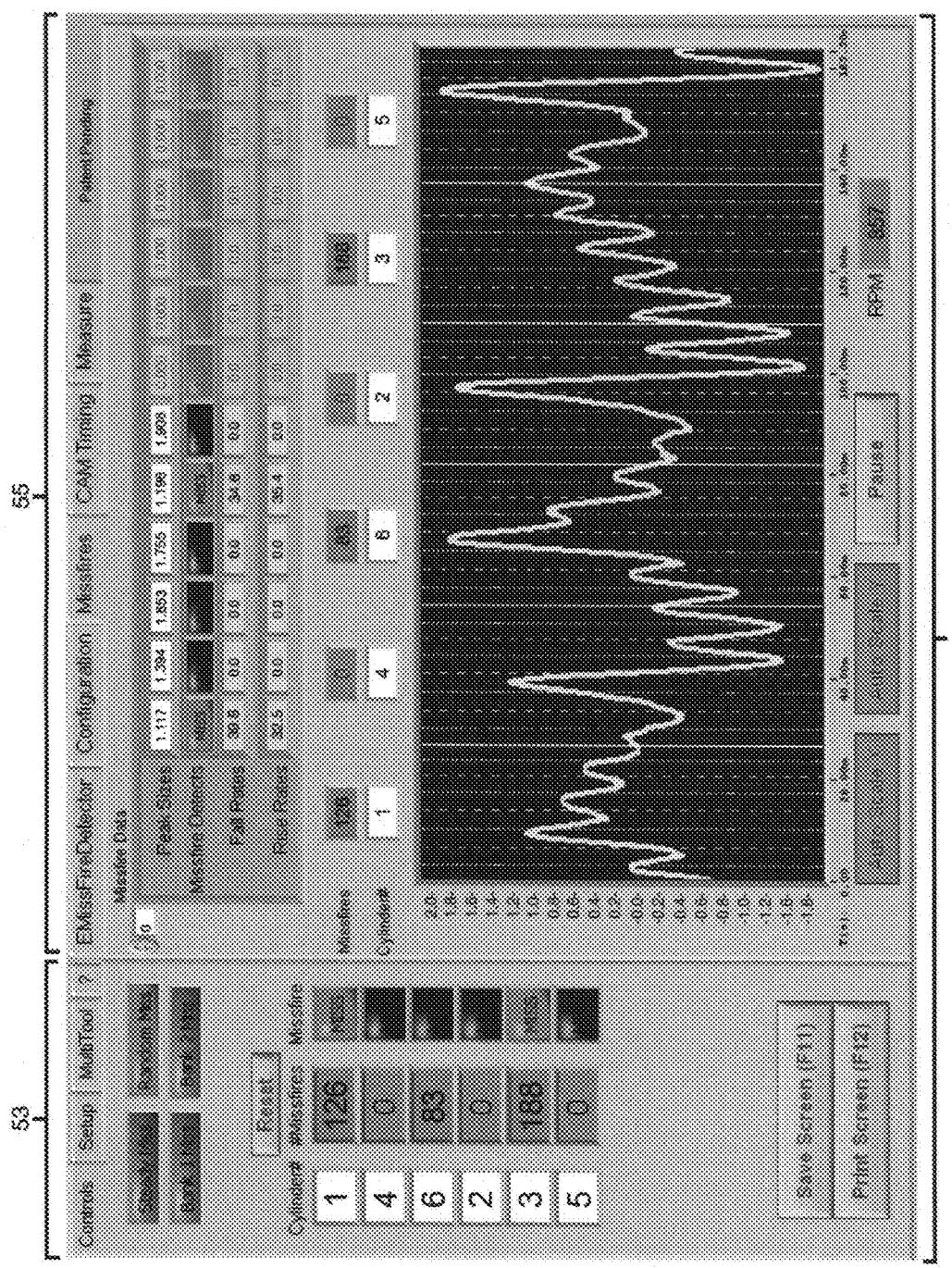
FIG. 11 shows the screen display with test data being collected with a basic pressure transducer from the running V-6 engine of FIG. 10, with multiple misfires occurring during the same fire cycle.

FIG. 10 shows screens 53 and 55 opened to the Setup and Configuration tabs in preparation for testing a GM, 2000, 6 cylinder, 4.3 liter V-6 engine for misfires. As with regard to the discussion of FIG. 6, once the correct engine is selected from the drop down window the engine configuration, cylinder location and firing order is correctly displayed. The distributor is also displayed (between the drop down window and the representation of the engine configuration). With reference to the graph in FIG. 11, the cylinder boxes of each cylinder showing the associated pressure waves are illustrated. With further reference to the Missfires screen: the Peak Sizes for each cylinder are identified; the Missfire Detects windows are illuminated for the 1st, 6th and 3rd cylinders; and the Fall Rates and Rise Rates for each cylinder are displayed. In the Missfires row (between the Rise Rates row and the Cylinder # row) the misfiring cylinders are again identified, together with the number of misfires detected. When a particular cylinder misfires (e.g., 1, 3 and 6) the associated misfire counter increases by one count for each detected misfire. If, as illustrated in FIG. 11, section 53, Controls, there are several misfires occurring and the events are not isolated to one bank or the other, the "RANDOM MISS" light is illuminated. If there are several misfire events on the same bank then a lamp for that misfiring engine bank is illuminated.

Figure 8:
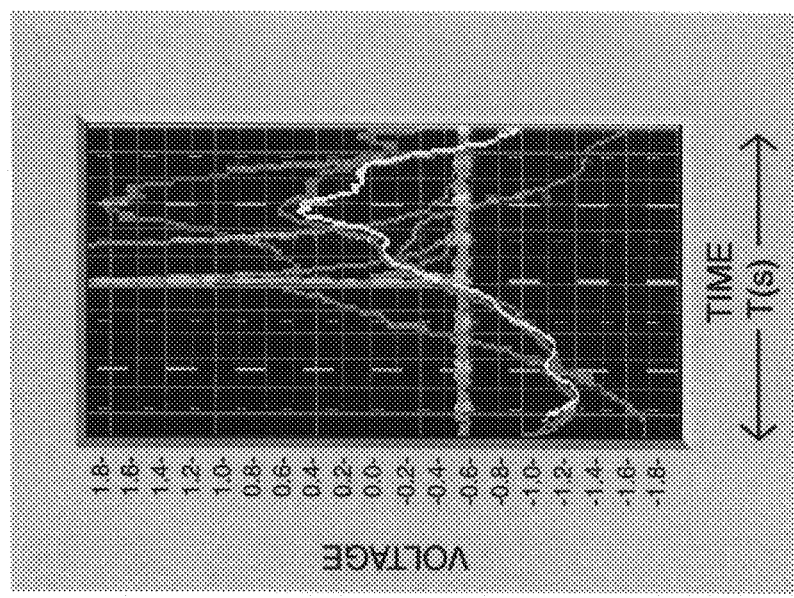
FIG. 8 shows, in color, the graphs of FIG. 7 superimposed on each other.
Figure 9:
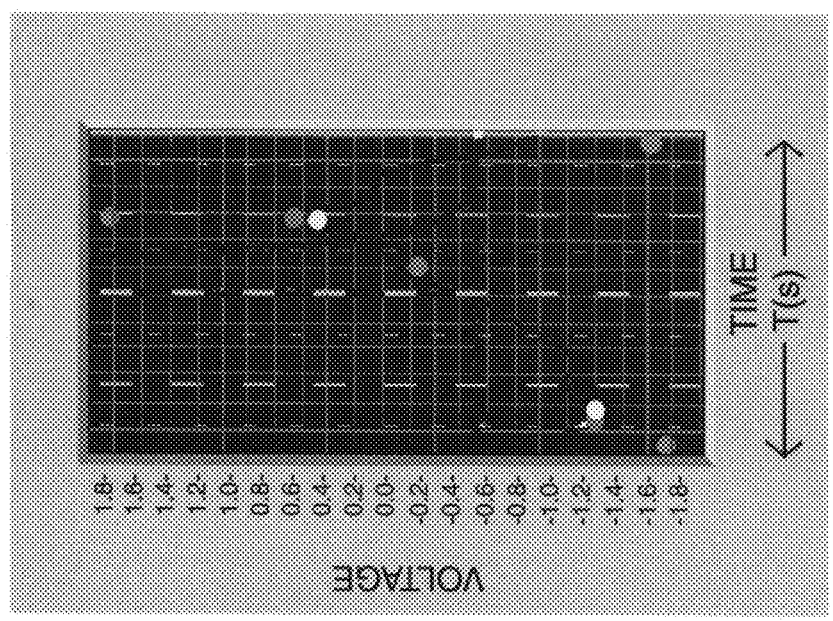
FIG. 9 shows, in color, the high and low points for each of the graphs illustrated in FIGS. 7 and 8, and the associated time spacing.
Figure 12:
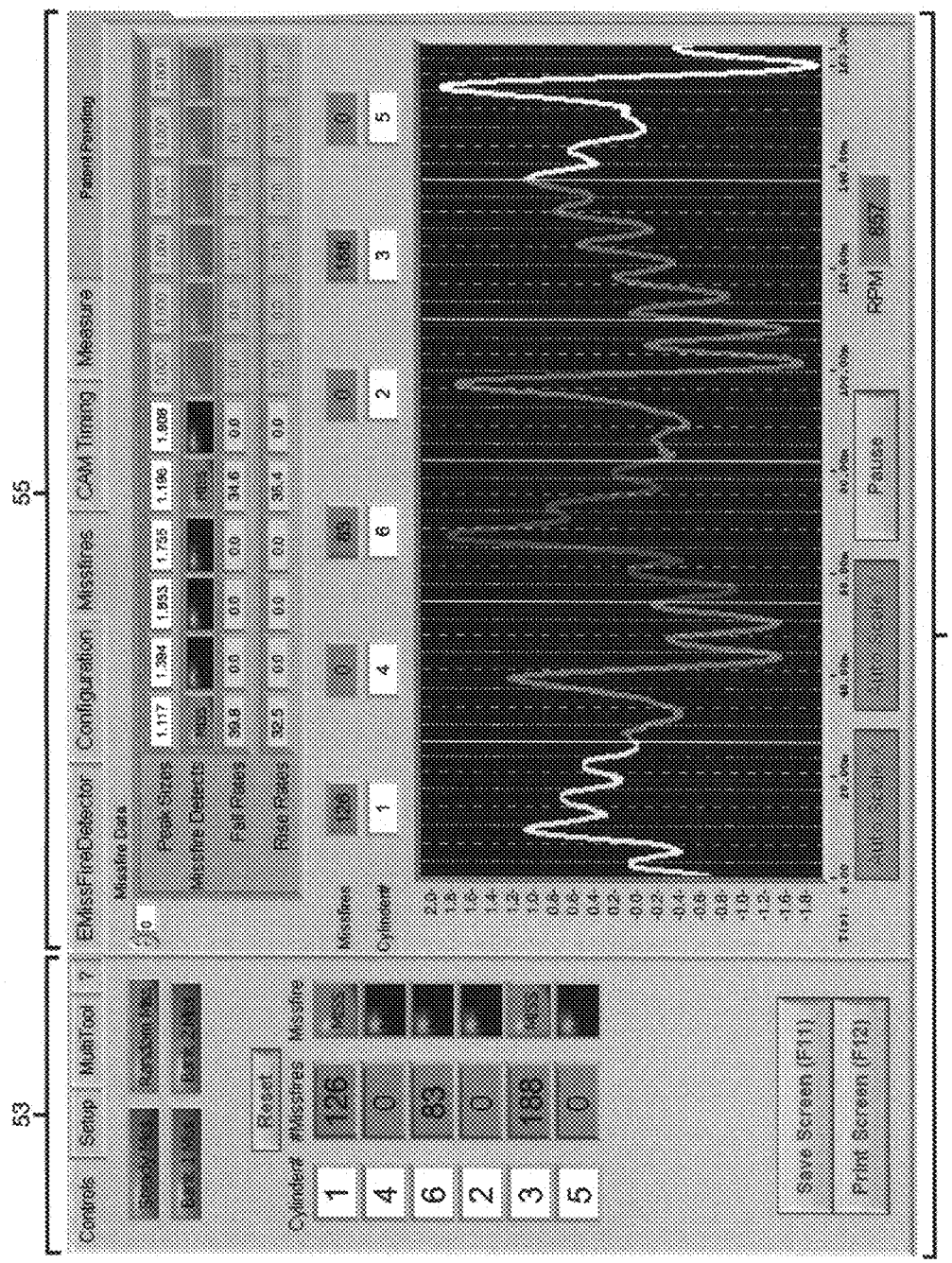
FIGS. 12-14 show, for the V-6 engine of FIG. 10, the same type of information as illustrated in FIGS. 7-9.
Figure 13:
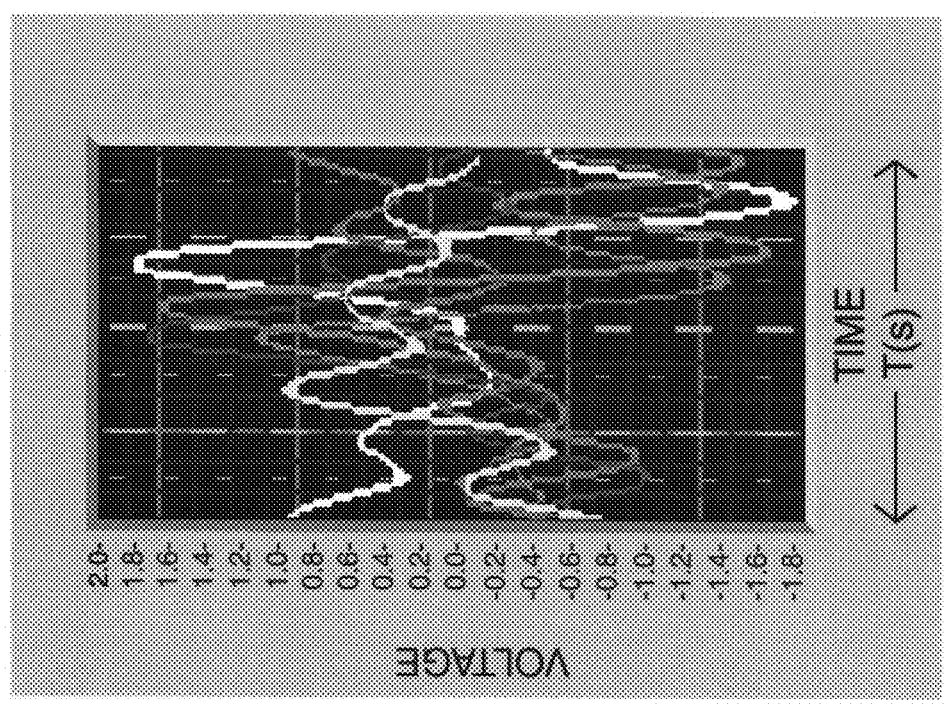
Figure 14:
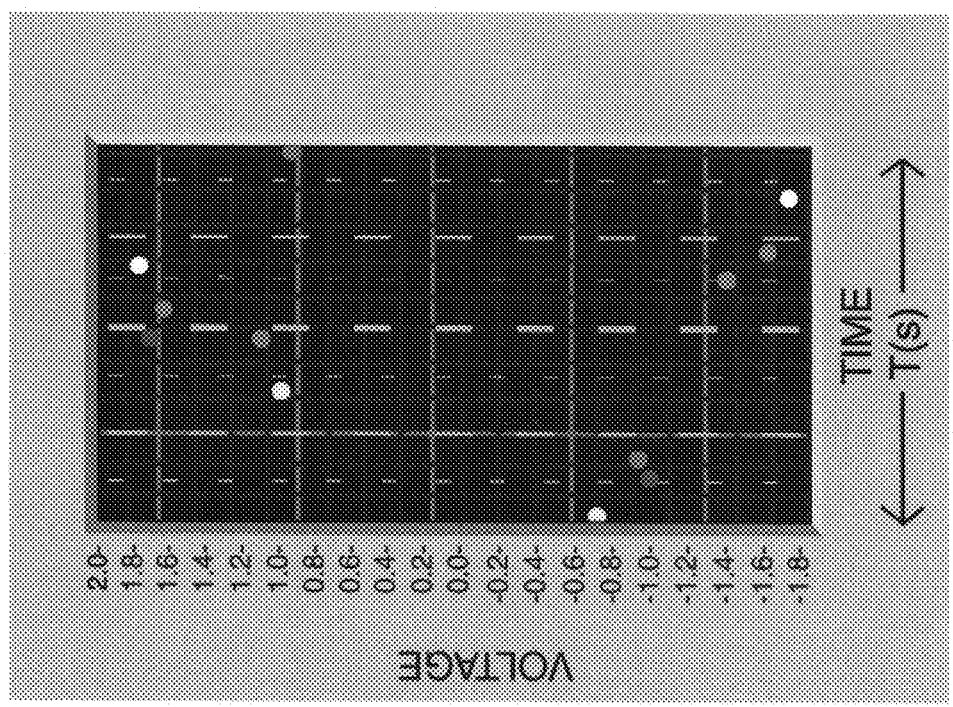

FIGS. 12-14 illustrate the same type of information for the six cylinder engine of FIG. 10 as FIGS. 7-9 illustrate for the previously described 4 cylinder engine. The graphs for each cylinder are indicated in different colors in FIG. 12. These same graphs are superimposed in FIG. 13. Finally, FIG. 14 illustrates the high and low points of each cylinder. Though not as obvious because there are multiple misfires, the same analysis set forth above with regard to FIG. 9 applies.

Figure 15:
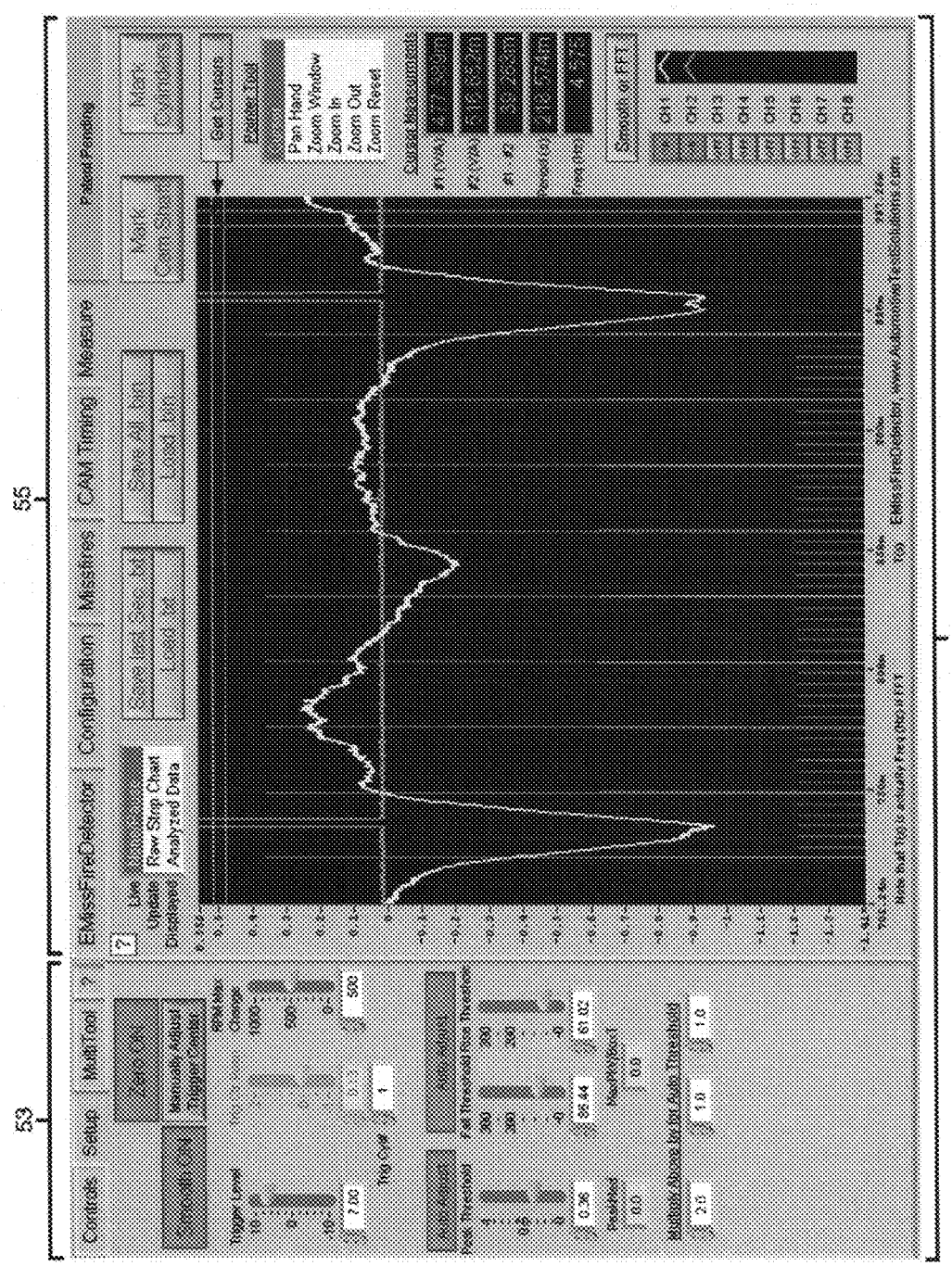
FIG. 15 illustrates the ATS Venturi Amplifier on a 1999 GMC 5.3 liter engine with a misfire on cylinder #1.
Figure 16:
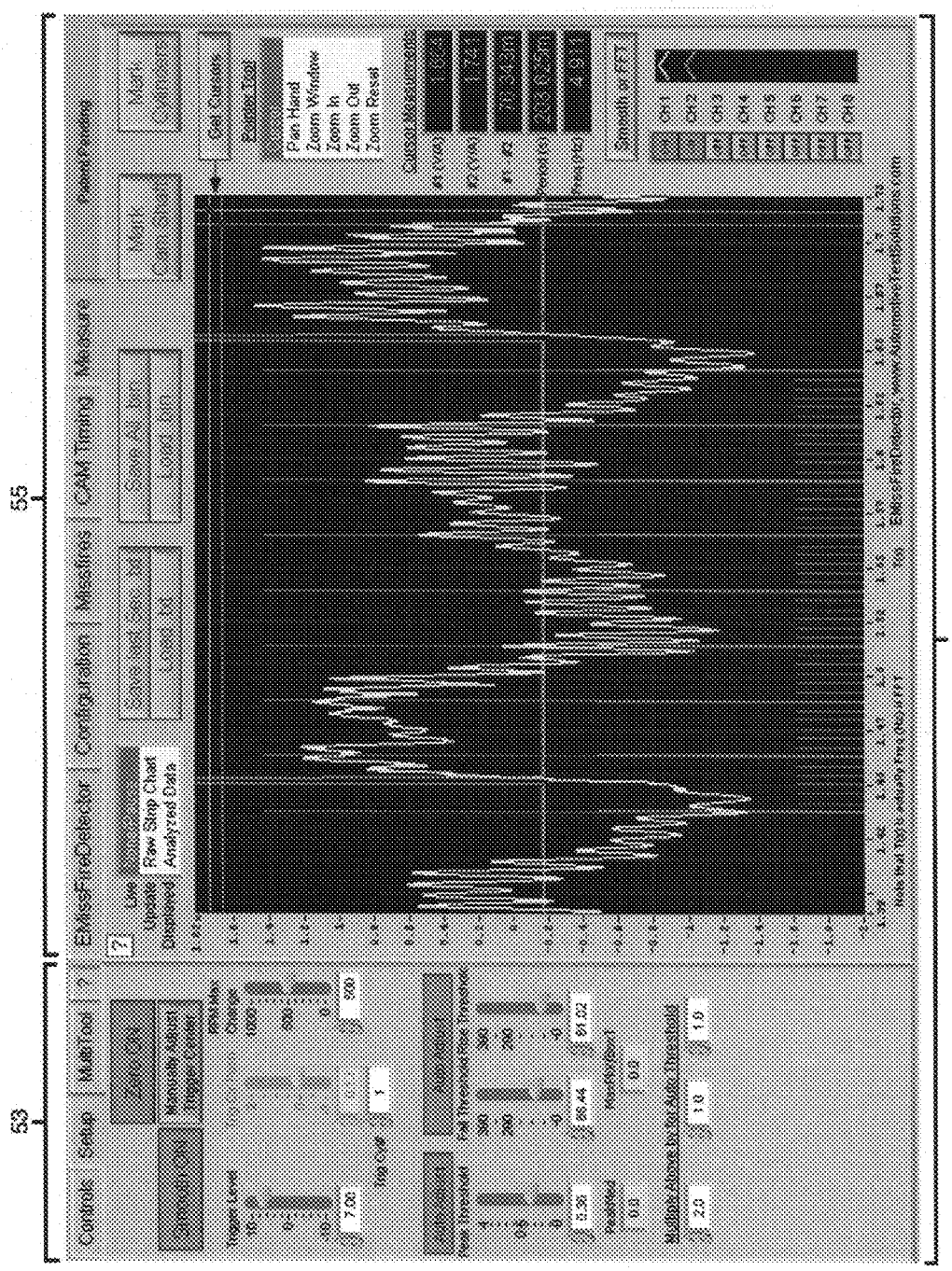
FIG. 16 illustrates the SenX sensor on the same 1999 GMC 5.3 liter engine with the same misfire on cylinder #1.
Figure 17:
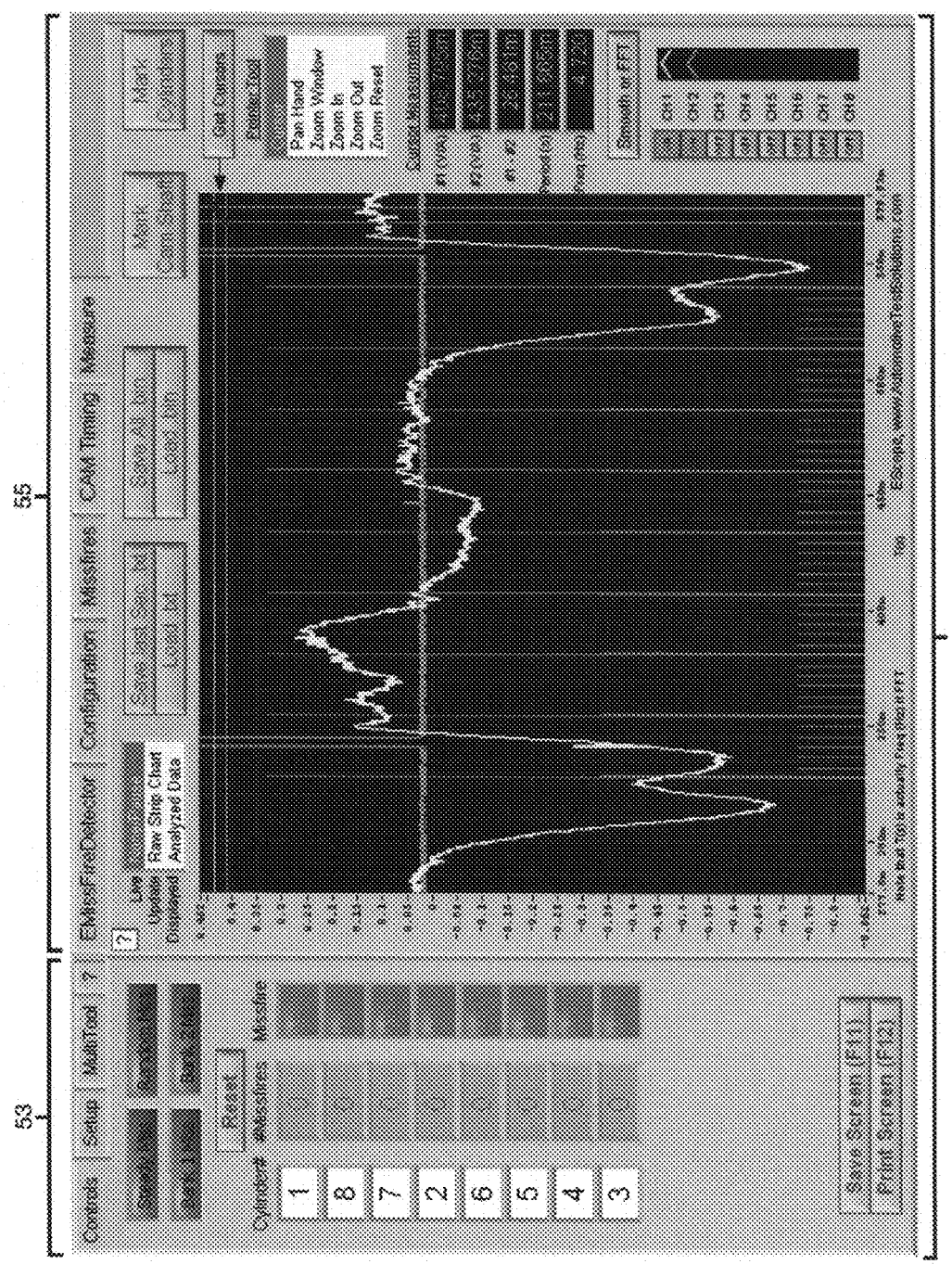
FIG. 17 illustrates the ATS Venturi Amplifier on the same 1999 GMC 5.3 liter engine with misfires on cylinders #1 and #3.
Figure 18:
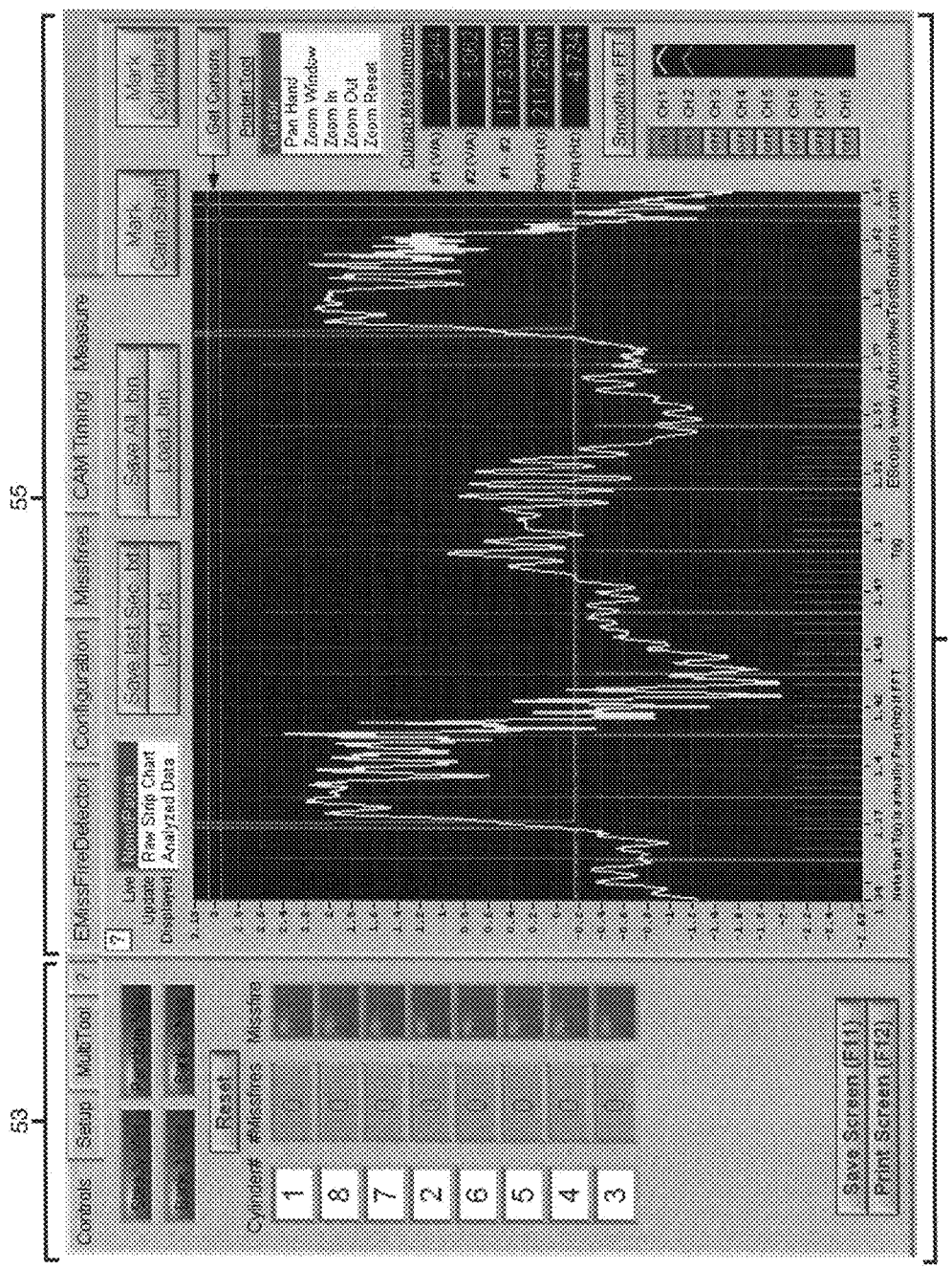
FIG. 18 illustrates the SenX sensor on the same 1999 GMC 5.3 liter engine with the same misfires on cylinders #1 and #3.

In the preferred embodiment of the invention the venturi amplified sensor disclosed and claimed in co-pending U.S. patent application Ser. No. 11/879,565 (the "ATS Venturi") is used to produce a more usable waveform. With the ATS Venturi sensor a pressure transducer is still used but it is connected into the venturi instead of directly into the tailpipe. The foregoing is demonstrated by FIGS. 15-18 which illustrates data taken from a 2000 GM 5.3 liter engine running at idle. With the "Measure" tab on screen 55 open, FIG. 15 shows the ATS Venturi waveform with cylinder 1 missing. FIG. 16 shows the SenX waveform with same cylinder 1 missing. FIG. 17 shows the ATS Venturi waveform with cylinders 1 and 3 missing. (Cylinder 1 and cylinder 3 are cylinders that fire in sequence as can be seen by the firing order; 1-8-7-2-6-5-4-3.) FIG. 18 shows the SenX waveform with same cylinders 1 and 3 missing. Because of the waveform from the SynX pressure sensor the misfire in cylinder 3 cannot be detected. This occurs at the 8th division (or cylinder box). In this case neither the amplitude nor the rise time of the SenX signal is adequate to permit detection of this misfire.

The data from FIGS. 15-18 is displayed on screen 55 with the "Measure" tab open. The screen allows the technician to view pressure waveform data and mark data for analysis. On the upper left side of the screen the type of "Live Update Displayed" is selected. "None/Pause" will stop the acquisition of data allowing the technician to zoom in or zoom out on the acquired data and mark this data. "Raw Strip Chart" will show the data that is currently being acquired and will be displayed on the screen. "Analyzed Data" will show live trigger to trigger events while being marked by either the cylinder box locations or the cylinder stroke locations (not shown). "Save last Sec .txt" button will save the last second of acquired data in a text file format. "Load .txt" button will allow the user to load the text files from the saved file folder. "Save All .bin" button will save the last 20 seconds of acquired data in a binary file format. "Load .bin" button will allow the user to load the binary files from the saved file folder. "Mark Cam Shaft" button will allow the user to overlay a stroke grid (not shown) on the pressure waveform. In operation the user will place vertical cursors from trigger to trigger and the grid will be marked between these vertical cursors. (The trigger signals are clearly marked on the screens illustrated in FIGS. 15-18 as the vertical spikes of the red graph (channel 2).) "Mark Cylinders" button will allow the user to overlay a cylinder box grid on the waveform, as is also illustrated in FIGS. 15-18. The cylinder boxes will be automatically configured for the number of cylinders that have been selected in the Configuration screen. "Get Cursors" button will allow the user to bring the cursors up onto the chart so the waveform can be marked. "Pointer Tool" selection: "Cursor" will allow the user to move the cursors. "Pan Hand" will allow the user to move the graph along the X or Y axis. "Zoom Window" will allow a picture frame to be selected and will zoom in on what is located inside the picture frame. "Zoom In" will allow the user to zoom in on the waveform.

"Zoom Out" will allow the user to zoom out on the waveform. "Zoom Reset" will allow the data to be reset to its original format. "Cursor Measurements": "#1 (V/A)" will display the reading from the number 1 cursor. "#2 (V/A)" will display the reading from the number 2 cursor. "#1-#2" will subtract the number 1 cursor from the number 2 cursor and display the difference. "Period (s)" will display the time between the vertical cursors. "Freq (Hz)" will display the hertz from the vertical cursors. "Smooth or FFT" button will allow the user to smooth the waveform or process the waveform with Fast Fourier Transform. "CH1 through CH8" buttons allow the traces to be turned on or off on the chart.

The procedure to adjust increasing RPM to trigger signal so as to center the peak of the waveform pulse in the correct cylinder box is as follows. First, the distance between triggers is divided up into n cells where n is the number of cylinders. The amount that the misfire pressure waveform is moved to the right (as viewed in the graphs of the figures) of the position of the trigger signal is determined by the following tables, where the amount moved is linearly interpolated between the given RPMs in the tables.

| Up to 4 Cylinders | |
| --- | --- |
| Amount of Cell Moved Right | RPM |
| 0.130 | 700 |
| 0.000 | 900 |
| −0.440 | 1500 |
| −0.800 | 2200 |
| −0.840 | 2700 |

| 5-6 Cylinders | |
| --- | --- |
| Amount of Cell Moved Right | RPM |
| 0.250 | 700 |
| 0.000 | 900 |
| −0.590 | 1342 |
| −1.320 | 2200 |
| −1.460 | 2500 |

| 7 or more Cylinders | |
| --- | --- |
| Amount of Cell Moved Right | RPM |
| 0.500 | 700 |
| 0.000 | 900 |
| −1.040 | 1660 |
| −1.600 | 2000 |
| −1.690 | 2500 |

The foregoing tables, based on engine testing, also show that even at idle there is some drift (0.130 for a 4 cylinder engine at 700 RPM) and that this drift increases with increasing engine.

Figure 19:
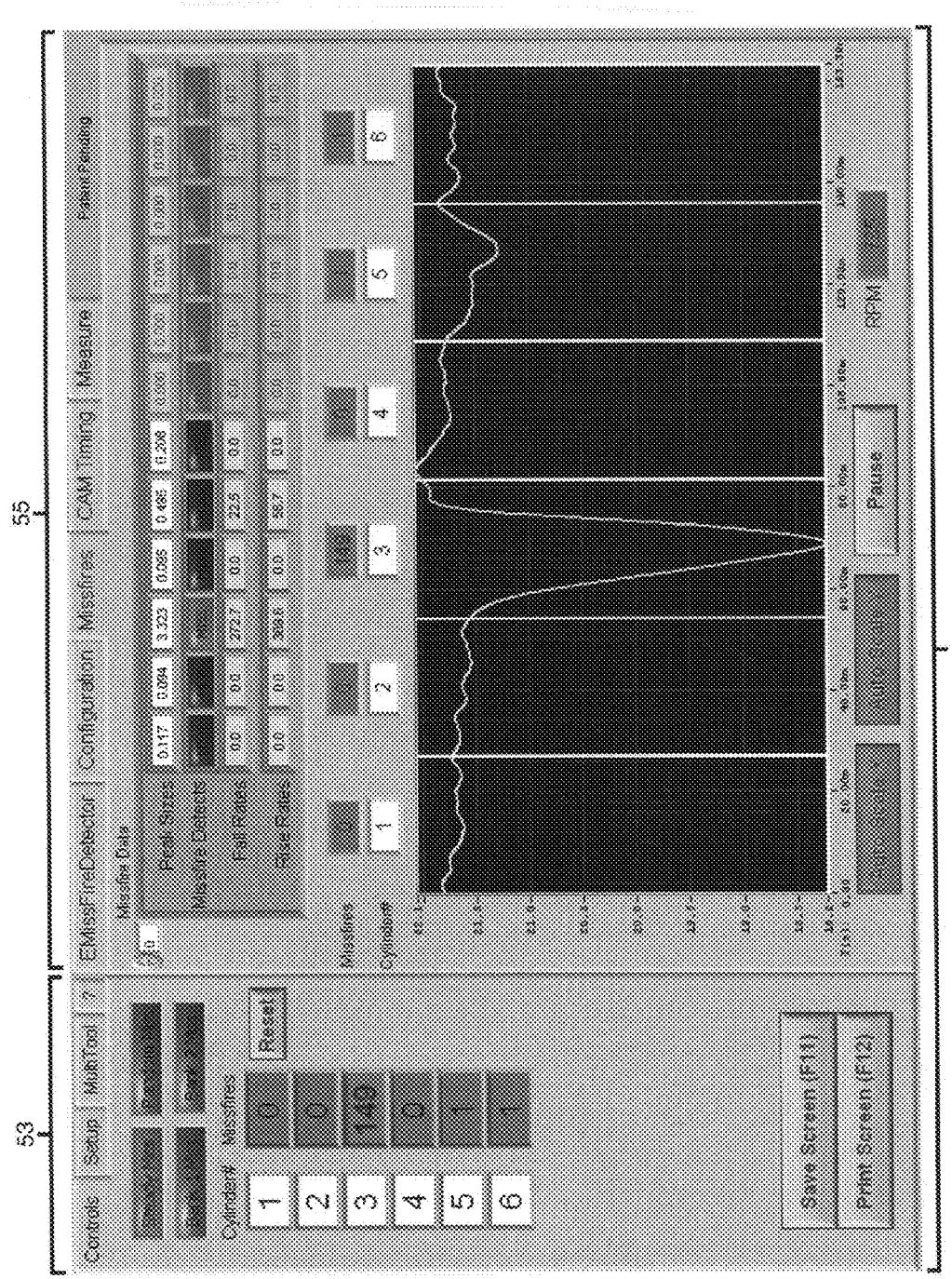
FIG. 19 illustrates the ATS Venturi Amplifier on a V6 engine showing a steady miss on cylinder #3.
Figure 20:
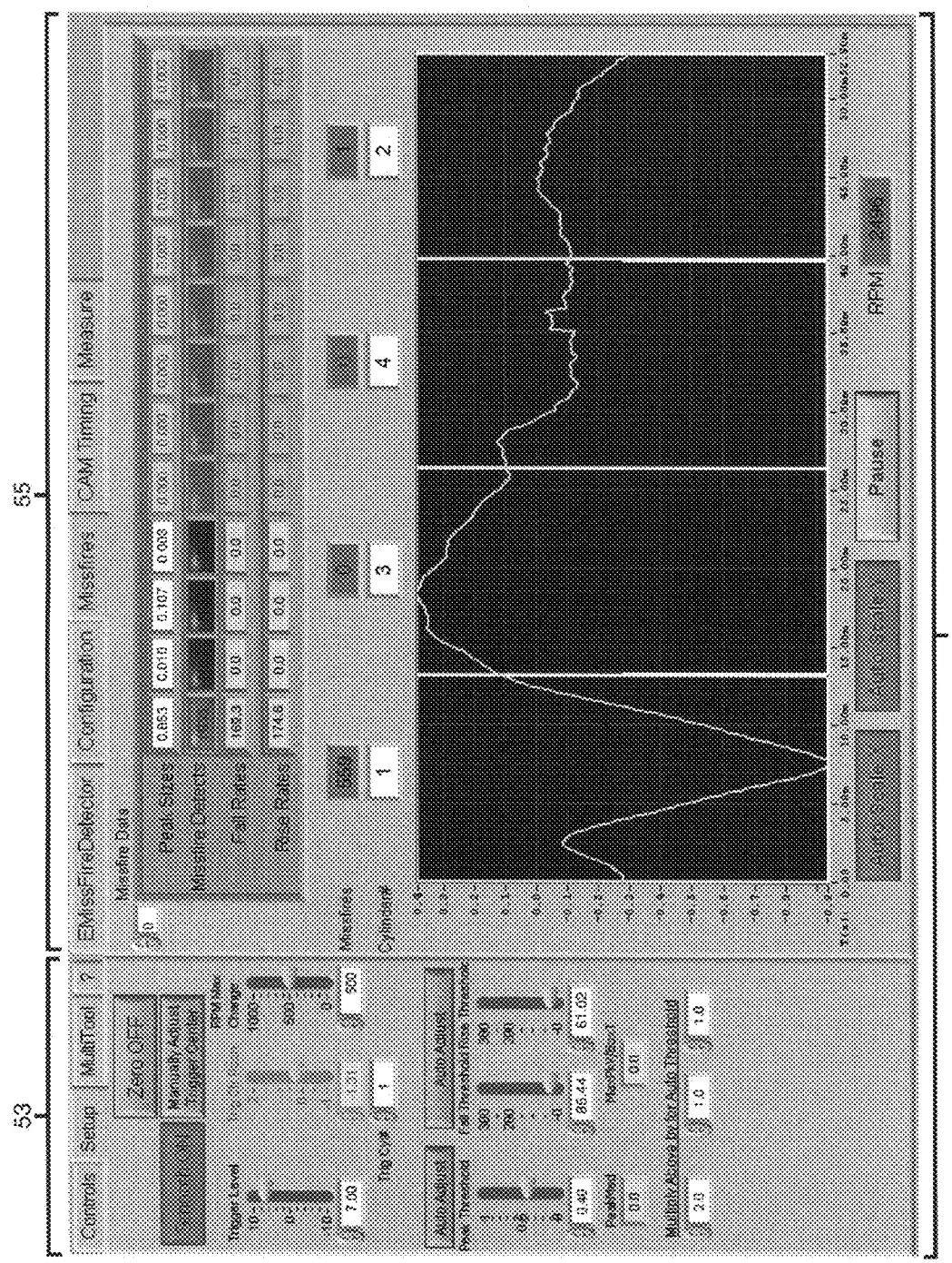
FIG. 20 illustrates a 4 cylinder engine with a misfire on cylinder #1.
Figure 21:
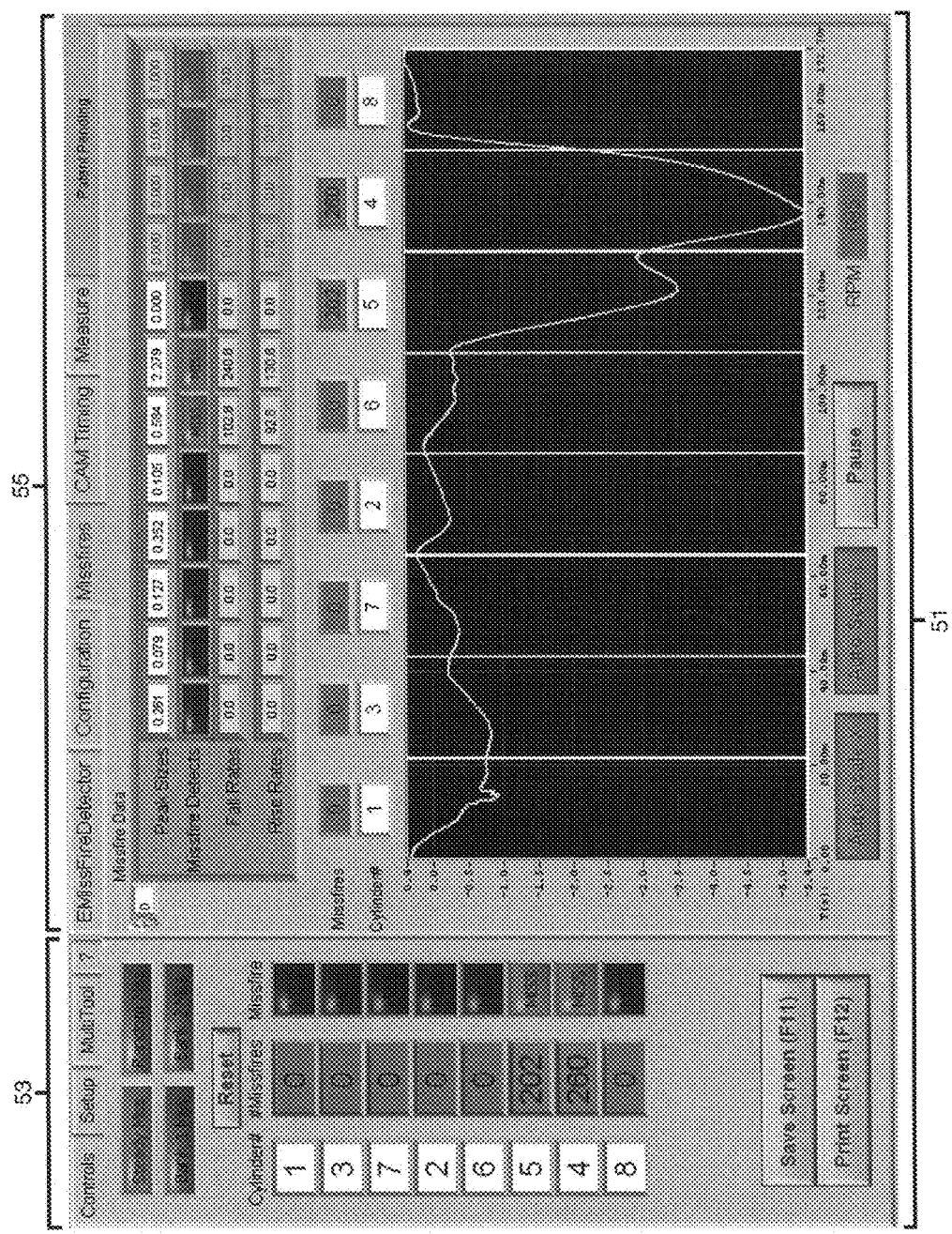
FIG. 21 illustrates the ATS Venturi Amplifier on a V8 engine with a steady miss on two back to back cylinders, #5 and #4.

Further examples with the use of the venturi sensor are set forth in FIGS. 19-21. FIG. 19, this is a 6 cylinder engine at idle with a steady miss indicated on the #3 cylinder. The waveform produced is from the ATS Venturi. The misfire is indicated by the steep drop in the 3rd cell. The other cells in this example have very little pressure change. This is due to the dampening effect that the ATS Venturi provides. With the ATS Venturi the misfire pressure waveform is very distinct with its steep drop and rise, thus it is easier to locate misfires in the internal combustion engine.

FIG. 20 is a 4 cylinder engine under load at 2496 RPM. Again, the waveform produced is from the ATS Venturi. The #1 cylinder is indicated as a misfire. The waveform in the first cell has a steep drop which has broken the threshold set points. The #2, #3, and #4 cells have very small pressure changes. With this amount of pressure change the threshold set points have not been crossed thus no indication of misfire on cylinders #2, #3, and #4.

FIG. 21 is an 8 cylinder engine at idle with a steady miss indicated on cylinder #5 and cylinder #4. Here, again the waveform produced is from the ATS Venturi. These misfires indicated on cylinder #5 and cylinder #4 occur in succession. The steep drop on #5 and the steep rise on #4 cross the threshold set points for a misfire, thus the misfire alert lights are turned on and the misfire counters are incremented forward.

Also illustrated in FIG. 1 are intake pressure sensing device 61, compression sensing device 63 and crank case sensing device 65. Sensor 61 is connected to A/D converter by cable 67; sensor 63, by cable 69; and sensor 65, by cable 71. The use of these sensors, in combination with the correct identification of an engine's misfiring cylinder or cylinders, enables the technician to identify the probable cause(s) of the misfire(s).

Whereas the drawings and accompanying description have shown and described the preferred embodiment of the present invention, it should be apparent to those skilled in the art that various changes may be made in the form of the invention without affecting the scope thereof.

The invention claimed is:

1. A method of identifying one or more misfires occurring in an internal combustion engine, the method including the steps of:
 a. running the engine;
 b. measuring the pressure pulses from the exhaust of the engine;
 c. generating a waveform from the measured pressure pulses;
 d. dividing the waveform into segments, one for each cylinder of the engine, wherein each segment represents a pressure pulse;
 e. associating each waveform segment with the cylinder which generated the pressure pulse; and
 f. examining each waveform segment for features which indicate a misfire.

2. The method as set forth in claim 1, further including the step of generating a trigger signal.

3. The method as set forth in claim 2, further including the step of associating the trigger signal with the ignition in one of the cylinders of the engine.

4. The method as set forth in claim 3, further including the steps of:
 a. measuring the time between the trigger signal and the next successive trigger signal; and
 b. dividing the time between the two trigger signals into a number of cylinder boxes, one for each cylinder of the engine.

5. The method as set forth in claim 4, further including the step of associating each one of the waveform segments with each one of the cylinder boxes, one waveform segment for each cylinder box.

6. The method as set forth in claim 5, further including the step of shifting each of the cylinder boxes relative to the associated waveform segment such that the peak of the segment and at least a portion of one of the rising edge of the waveform segment and the falling edge of the waveform segment fall within the cylinder box.

7. The method as set forth in claim 6, wherein the peak of each waveform segment is located in the center portion of its associated cylinder box.

8. The method as set forth in claim 6, further including the steps of:
   a. determining a threshold value for the peak value; and
   b. determining a threshold value for at least one of the rising edge and falling edge of the waveform segment.

9. The method as set forth in claim 8, wherein each of the thresholds is determined by first determining the medians for each of the peak values, rising edges and falling edges and then selecting the median from each group.

10. The method as set forth in claim 8, further including the step of, for each the cylinder box, comparing the peak with the threshold value for the peak.

11. The method as set forth in claim 10, further including the step of, for each cylinder box, comparing the rising edge of the waveform segment with the threshold value for the rising edge.

12. The method as set forth in claim 11, further including the step of, for each cylinder box, comparing the falling edge of the waveform segment to the threshold value for the falling edge.

13. The method as set forth in claim 12, further including the step of flagging, for each cylinder box, each of the thresholds that is exceeded.

14. The method as set forth in claim 13, further flagging each waveform segment and its associated cylinder box in which at least two of the thresholds are exceeded, each the flagging constituting a misfire.

15. The method as set forth in claim 14, further including the step of synchronizing each of the cylinder boxes and its associated waveform segment with the cylinder in which the pulse was generated.

\* \* \* \* \*